(12) United States Patent
Hirasawa

(10) Patent No.: US 6,824,062 B2
(45) Date of Patent: Nov. 30, 2004

(54) CARD TRANSPORTING MECHANISM FOR CARD READER

(75) Inventor: Kenji Hirasawa, Nagano (JP)

(73) Assignee: Kabushiki Kaisha Sankyo Seisakusho, Nagano (JP)

( * ) Notice: Subject to any disclaimer, the term of this patent is extended or adjusted under 35 U.S.C. 154(b) by 0 days.

(21) Appl. No.: 09/542,866

(22) Filed: Apr. 4, 2000

(65) Prior Publication Data

US 2002/0117550 A1 Aug. 29, 2002

(30) Foreign Application Priority Data

| May 24, 1999 | (JP) | ............................................. 11-143167 |
| May 17, 1999 | (JP) | ............................................. 11-136084 |
| May 17, 1999 | (JP) | ............................................. 11-136215 |
| Aug. 31, 1999 | (JP) | ............................................. 11-245260 |

(51) Int. Cl.$^7$ ............................................. G06K 13/04
(52) U.S. Cl. ...................... 235/479; 235/480; 235/483; 235/486
(58) Field of Search ............................... 235/479, 480, 235/486, 439, 483

(56) References Cited

U.S. PATENT DOCUMENTS

| 4,900,908 A | * | 2/1990 | Tsutsui ........................ 235/475 |
| 4,933,537 A | | 6/1990 | Takahashi et al. |
| 4,935,916 A | * | 6/1990 | Suzuki et al. ................ 235/479 |
| 4,994,658 A | * | 2/1991 | Takahashi et al. ........... 235/473 |
| 5,146,070 A | | 9/1992 | Toma |
| 5,192,858 A | * | 3/1993 | Sakurada ...................... 235/475 |
| 5,196,687 A | * | 3/1993 | Sugino et al. ............... 235/483 |
| 5,646,392 A | * | 7/1997 | Oguchi ......................... 235/475 |
| 5,696,369 A | * | 12/1997 | Watanabe ..................... 235/454 |
| 5,821,515 A | * | 10/1998 | Kitahara ....................... 235/441 |
| 5,850,079 A | * | 12/1998 | Ohwa ........................... 235/475 |
| 6,574,058 B1 | * | 6/2003 | Aruga et al. .................... 360/2 |

FOREIGN PATENT DOCUMENTS

| DE | 196 06 692 A1 | 8/1997 | |
| JP | 5-84588 | 12/1993 | ........... G11B/17/00 |

* cited by examiner

Primary Examiner—Michael G. Lee
Assistant Examiner—Seung H Lee
(74) Attorney, Agent, or Firm—Sughrue Mion, PLLC

(57) ABSTRACT

A card reader is provided with a card transporting mechanism wherein the trailing end of a card as viewed in a card transporting direction is brought into contact with a first card engaging/holding member moving in a card transporting direction, and the card is transported by the first card engaging/holding member. The card transporting mechanism includes a carriage movable in the card transporting direction, and the first card engaging/holding member is mounted so that the first card engaging/holding member is movable between a first position where the first card engaging/holding member comes in contact with the trailing end of the card and a second position where the first card engaging/holding member does not come in contact with the card.

7 Claims, 24 Drawing Sheets

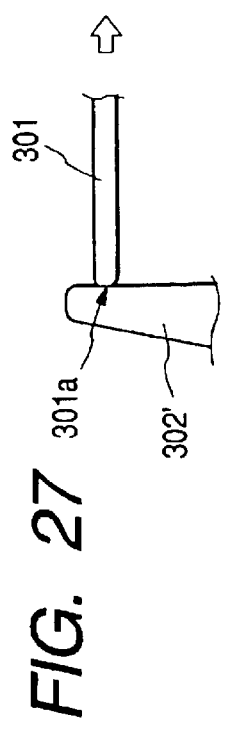
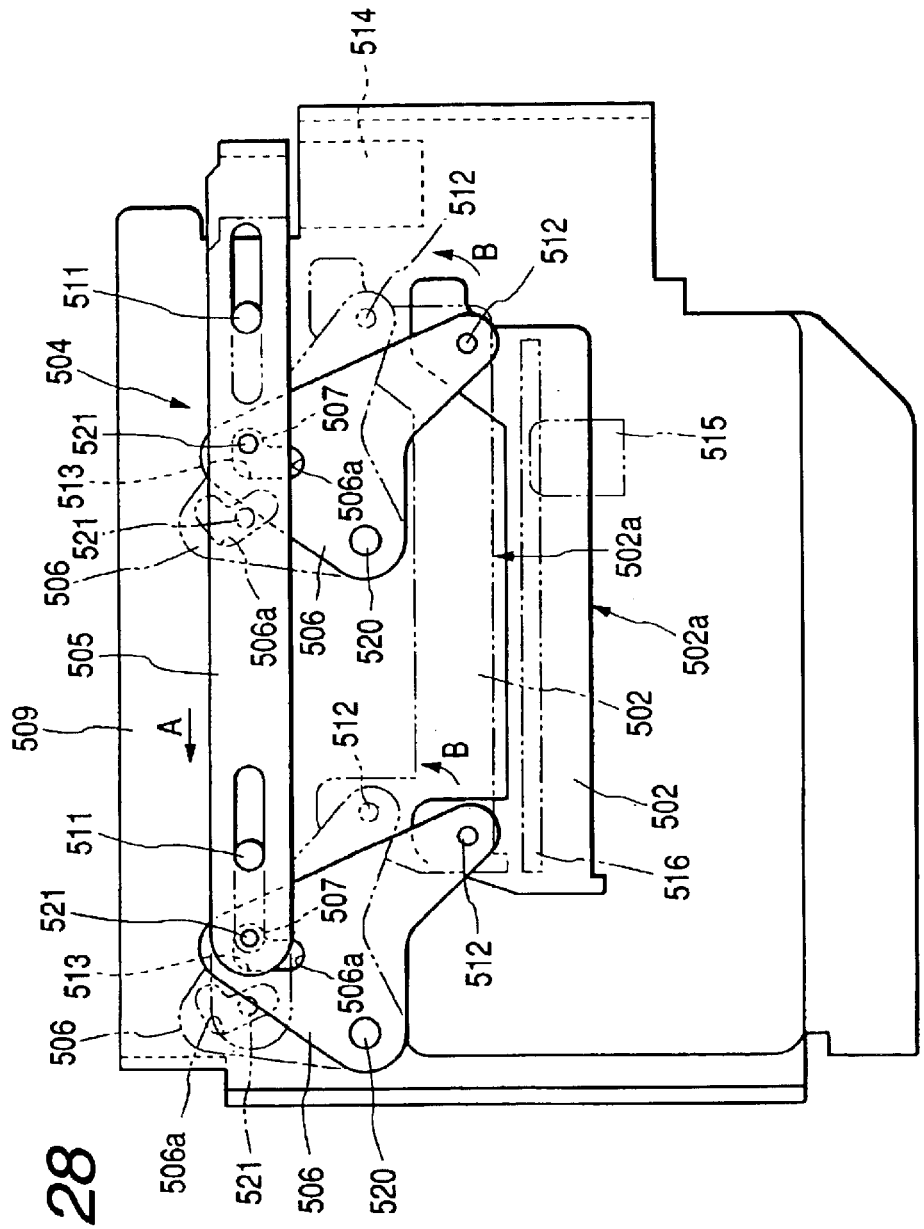

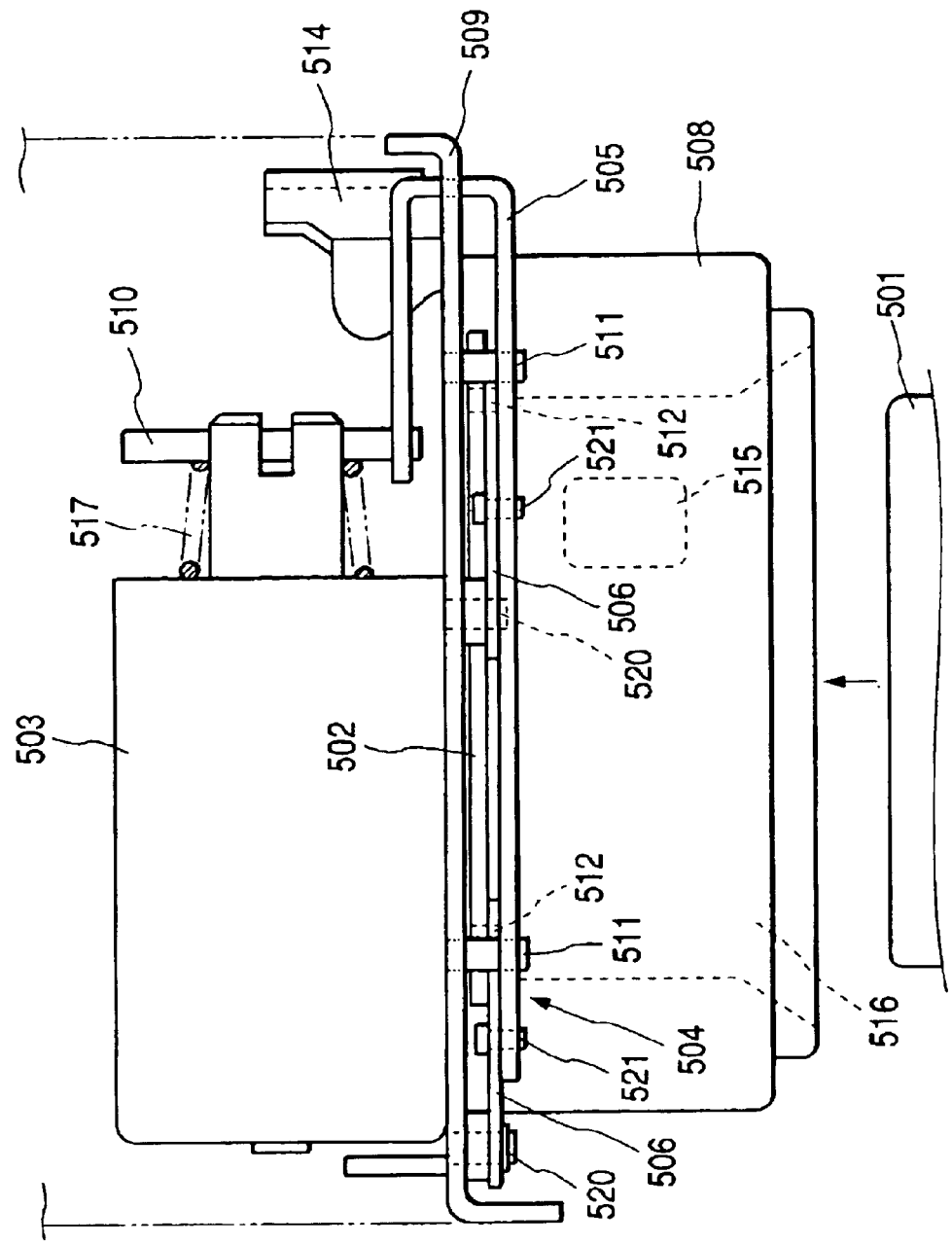

CARD TRANSPORTING MECHANISM FOR CARD READER

BACKGROUND OF INVENTION

1. Field of the Invention

The present invention relates to a card transporting mechanism in a card reader. More particularly, the invention relates to a card transporting mechanism of the type in which a card is transported in a state that the card is firmly held with engaging/holding means.

The present invention relates to a drive-force transmission mechanism and a card transporting mechanism using the same. More particularly, the invention relates to a drive-force transmission mechanism for selectively transmitting a rotation of a motor to one of two drive systems, and a card transporting mechanism for a card reader, for example, which uses the drive-force transmission mechanism.

The present invention relates to a shutter opening/closing mechanism. More particularly, the invention relates to a shutter opening/closing mechanism adaptable for the opening and closing of a card entrance of a card reader (writer).

2. Related Art

A card transporting mechanism of the type in which the card is transported in a state that the card is firmly held on a card table (Examined Japanese Patent Publication Hei 5-84588) is known for a card transporting mechanism for transporting a card as an information recording medium. In this type of the card transporting mechanism, a card engaging/holding member is moved by the utilization of a moving operation of the card table, to thereby firmly hold the card on the card table. Specifically, a tapered surface is provided at a predetermined position on a moving path of the card table. The engaging/holding member is slid on the tapered surface to move in a direction perpendicular to the card-table moving direction, whereby the card is firmly put between the engaging/holding member and the card table.

The card transporting mechanism suffers from the following problems to the solved, however. In the transporting mechanism, the card table is moved and the engaging/holding member slides on the tapered surface. During the course of the sliding of the engaging/holding member, it gradually holds the card on the card table. Because of this structure, the card must be moved by use of a take-in roller or the like until the card is firmly held, so as not to shift a position of the card relative to the moving card table from its correct position. Actually, it is very difficult to make a moving speed of the card table to be equal exactly to a feeding speed of the roller. Where a difference between those speeds becomes large, the taken-in roller will be scraped or ground, and the card will come off.

In the card transporting mechanism, the card is held by the utilization of the tapered surface. In other words, it is impossible to release the card from being held at other positions than a position at which the tapered surface is provided, and the card is inevitably released at the position at which the tapered surface is provided. For this reason, during its use, it is impossible to change the card transporting path to another card transporting path in accordance with another card to be used. In other words, when the card is transported passing the card-transporting path, the card must be transported while the card is firmly held on the card table. When the current card transporting path is changed to another card transporting path, the card must be removed from the card table. However, in the conventional card transporting mechanism, it is impossible to hold the card or releasing the card from being held when the card is on the card transporting path.

There is known a card reader which comprises a first card drive system for transporting a card to and receiving it from an card entrance, a second card drive system for performing a read/write operation of data to and from the card received from the first card drive system while transporting the card (when the received is a magnetic card) or after the card is transported to a predetermined position (when the card is an IC card), a motor capable of transporting the card in a card take-in direction and a card discharging direction by switching the rotational direction between a forward direction and a reverse direction, and a clutch mechanism for selectively transmitting a rotational force of the motor to the first or second card drive system. In this type of the card reader, it is necessary to transmit the forward and reverse rotational forces of the motor to the first card drive system or the second card drive system. A general measure has been taken for satisfying this necessity is to switch the transmission path of the rotational force by the motor by use of an electromagnetic clutch.

However, the electromagnetic clutch is expensive, and the measure to switch the transmission path of the rotational force by the motor by use of an electromagnetic clutch needs increased cost to manufacture, and hence makes it difficult to reduce cost and weight. Additionally, where the electromagnetic clutch is used, power consumption is great.

In the card reader, a shutter opening/closing mechanism is provided at the card entrance (gate) for the purpose of preventing crimes and mischief. A conventional shutter opening/closing mechanism is arranged such that, as shown in FIG. 34, an card entrance 5101 is entirely closed with a shutter plate 5103 of which the center of rotation lies at one of the right and left sides of the shutter plate 5103. Specifically, when a solenoid 5104 is operated, the shutter plate 5103 is turned about a support shaft (center of rotation) to close the card entrance 5101. The shutter plate 5103 completely closes the card entrance 5101 in a manner that it is thrown down into a groove formed across the card transporting path. A closing state where the shutter plate 5103 is thrown into the groove is detected by a microswitch. When the card reader is in a stand-by state and the closing state cannot be detected, it is considered that a foreign matter is present between the card entrance 5103 and the groove. In this case, it is judged that a card trap member is applied thereto for the purpose of crimes, and the use of the card reader is prohibited.

In the shutter opening/closing mechanism, the card entrance 5101 is closed by turning the shutter plate 5103 about the support shaft 5102. At a location apart from the support shaft 5102, a depth of the groove into which the shutter plate 5103 is thrown may be selected to be L2. At a location near the support shaft 5102, the groove depth is selected to be L1 (<L2) at most. Therefore, when a card trap member is set at a location apart form the support shaft 5102, it may be detected relatively easily by a microswitch 5105. When it is set at a location near the support shaft 5102, if it is soft, the shutter plate 5103 is turned to a position substantially the same as the closing position of the shutter plate 5103. It is difficult to detect the card trap member by the microswitch 5105. In this sense, its detecting performance is poor.

Since the shutter plate 5103 is turned about the support shaft 5102, a necessary stroke quantity is secured at a location near the support shaft 5102 of the shutter plate

5103, it is necessary to increase a stroke quantity at a location apart from the support shaft 5102. Therefore, a large solenoid must be used for the solenoid 5104. When a user quickly inserts a card into the card reader, the card sometimes hits the shutter plate 5103. In order to reliably open the shutter plate 5103 when the card hits the shutter plate 5103 at a location apart from the support shaft 5102, it is necessary to increase the output of the solenoid 5104. This necessitates a large solenoid 5104.

SUMMARY OF INVENTION

The present invention relates to a card transporting mechanism which is capable of preventing the adverse effect by the difference between the moving speed of the card table and the transporting speed of the roller, and allowing the releasing of the card from being held at any position on the card transporting path.

The present invention has been made to solve the above problems, and another object of the invention is to provide a method and mechanism for forcibly discharging a card which are capable of forcibly discharging a card by merely changing somewhat a card transporting mechanism indispensable to a card reader and without any additional mechanism and parts, to thereby secure cost and size reduction.

Accordingly, another object of the present invention is to provide a drive-force transmission mechanism which is low in manufacturing cost, easy in reducing size and weight, and is small in power consumption.

Another object of the present invention is to provide a card transporting mechanism which is well adaptable for a card reader by using a drive-force transmission mechanism.

Another object of the present invention is to provide a shutter opening/closing mechanism which has good performance of detecting a foreign matter, e.g., a card trap member, and enables a solenoid for driving the shutter plate to be reduced in size.

BRIEF DESCRIPTION OF DRAWINGS

FIG. 27 is a side view showing another embodiment of a card engaging/holding member in a card transporting mechanism of the present invention.

FIG. 28 is a front view showing a fourth embodiment of a shutter opening/closing mechanism according to the present invention.

FIG. 29 is a plan view showing the shutter opening/closing mechanism.

DETAILED DESCRIPTION OF PREFERRED EMBODIMENTS

The preferred embodiments of the present invention will be described in detail with reference to the accompanying drawings.

First Embodiment

Figure 1:
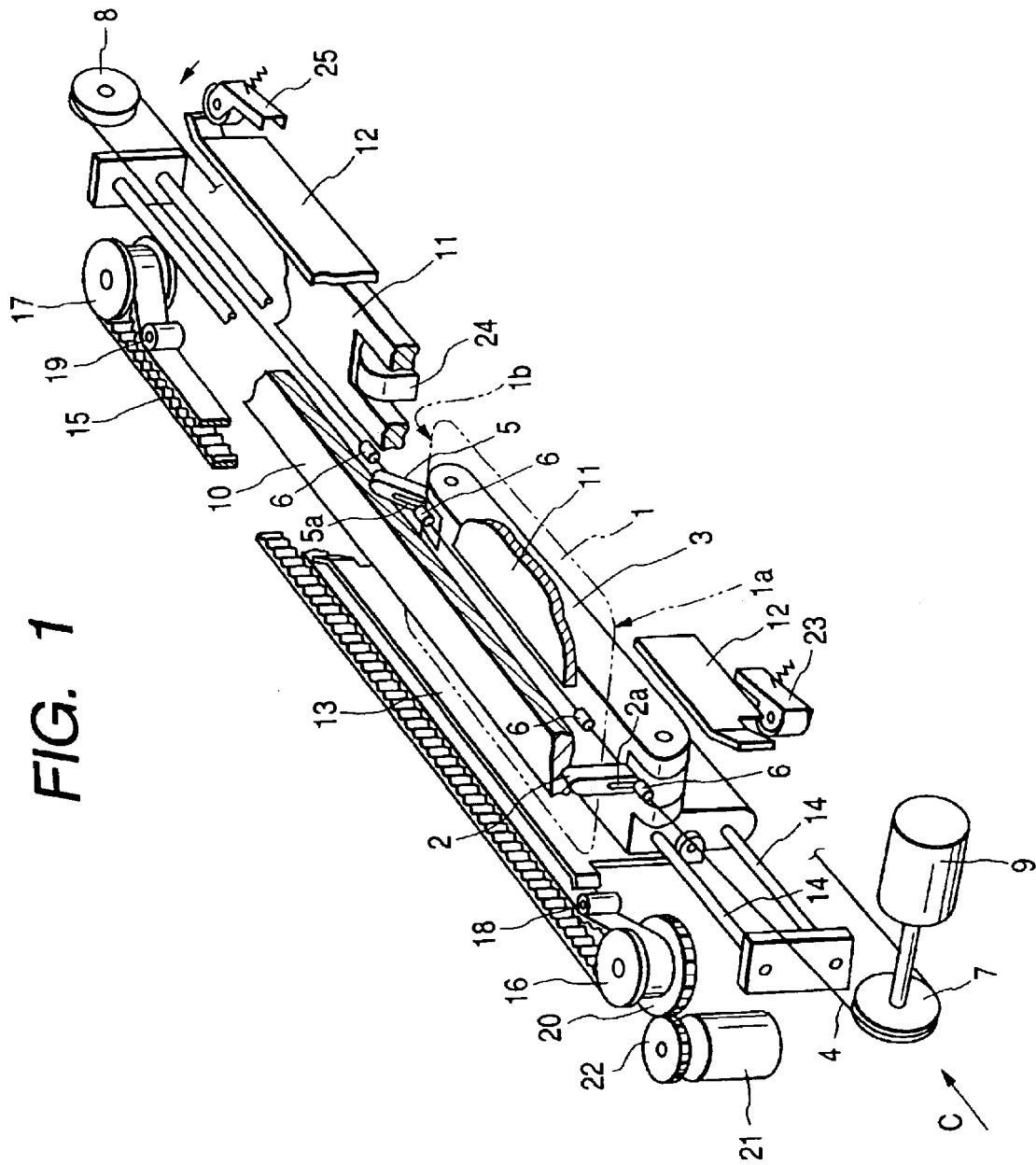
FIG. 1 is a perspective view showing a card transporting mechanism for a card reader into which the first embodiment of the present invention is incorporated.
Figure 2:
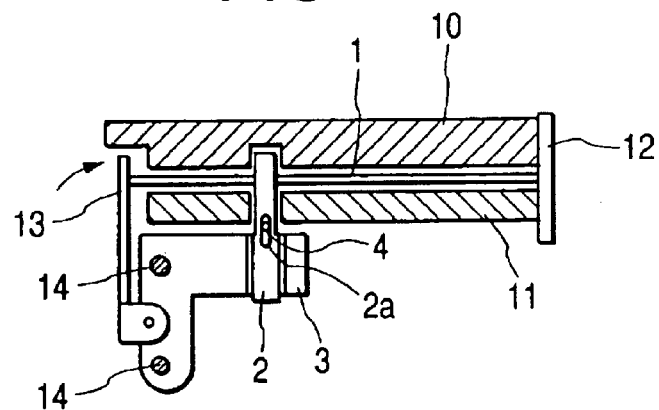
FIG. 2 is a cross sectional view showing the card transporting mechanism of FIG. 1.
Figure 3:
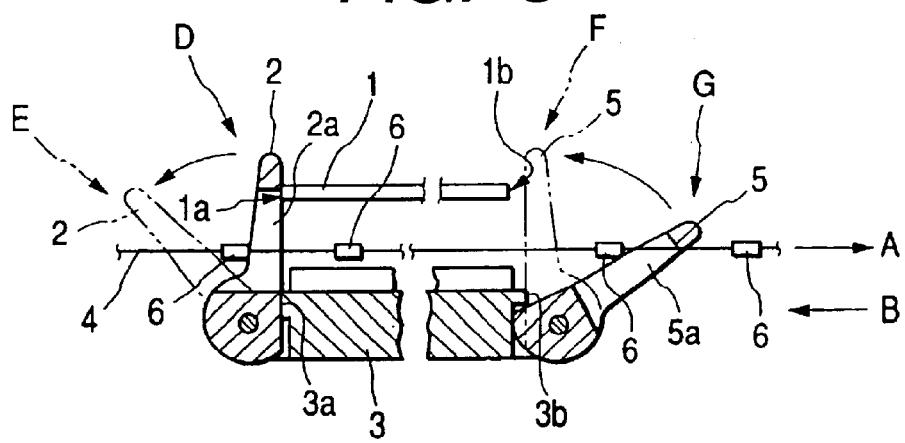
FIG. 3 is a cross sectional view showing a relationship between first and second card engaging/holding members and a card-drive member in the FIG. 1 card transporting mechanism.
Figure 4:
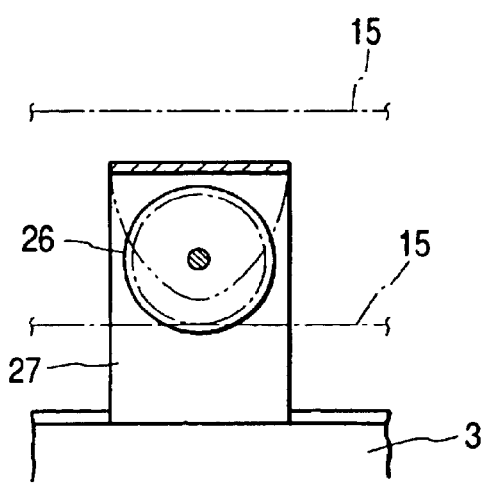
FIG. 4 is a plan view showing another card transporting mechanism for a card reader into which the invention is incorporated.
Figure 5:
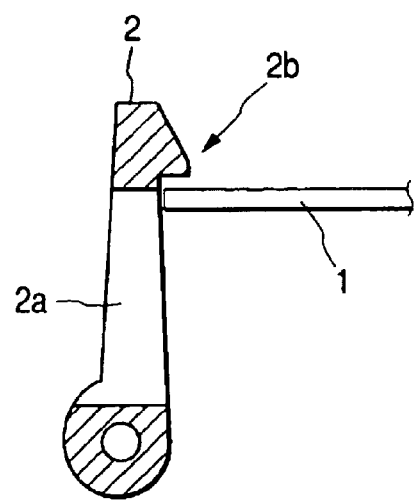
FIG. 5 is a cross sectional view showing a modification of the card engaging/holding member in the card transporting mechanism for a card reader into which the invention is incorporated.

FIGS. 1 through 3 show an instance of an embodiment of a card transporting mechanism for a card reader into which the present invention is applied. In the card transporting mechanism, a trailing end face 1a of a card 1 when viewed in the card moving direction is brought into contact with a first card engaging/holding member 2, and the card 1 is transported by the first card engaging/holding member 2. The first card engaging/holding member 2 is mounted on a carriage 3 such that the member is movable between a position (referred to as a card holding position D) at which the member comes in contact with the trailing end face 1a of the card 1 and another position (referred to as a stand-by position E) at which the member does not contact with the same. A card-drive member 4 for driving the card 1 to move is coupled with the first card engaging/holding member 2 such that a position of the first card engaging/holding member 2 changes depending on a moving direction of the card-drive member 4.

To move the card 1 in one direction, the card-drive member 4 drives the first card engaging/holding member 2 to move to the card holding position D, while at the same time moving the carriage 3 for carrying the card 1.

A second card engaging/holding member 5, which is movable between a position (referred to as a card holding position F) at which it comes in contact with the leading end face 1b of the card 1 and another position (referred to as a stand-by position G) at which it does not contact with the card 1, is coupled with the carriage 3 so that a position of the second card engaging/holding member 5 is changed depending on a moving direction of the card-drive member 4 by the card-drive member 4, and that the second card engaging/holding member 5 is placed at the stand-by position G when the first card engaging/holding member 2 is located at the card holding position D. In the reverse movement of the card 1, the second card engaging/holding member 5 is placed at the card holding position F, and the carriage 3 is moved for transporting the card 1.

The first and second card engaging/holding members 2 and 5, each shaped like a pawl, are mounted on the carriage 3 such that those may be turned within a predetermined angular range. Those card engaging/holding members 2 and 5 are turned in their raising direction and come in contact with protruded portions 3a and 3b. Those contact positions are the card holding positions D and F, respectively.

The card-drive member 4 takes the form of a string-like member which includes engaging pieces 6 so that it can control each of the card engaging/holding members 2 and 5 from both sides of it. In the embodiment, the card-drive member 4 is constructed by the utilization of a wire for the string-like member. The wire of the card-drive member 4 extends around a couple of pulleys 7 and 8, and is driven by a motor 9. The card-drive member 4 passes through elongated holes 2a and 5a formed in the first and second card engaging/holding members 2 and 5. The engaging pieces 6 are provided on both sides of each of the first and second card engaging/holding members 2 and 5. Each of the engaging pieces 6 has such a thickness that it cannot pass through each elongated holes 2a and 5a of those card engaging/holding members 2 and 5. The card-drive member 4 is a string-like member which includes the engaging pieces 6 so as to control each of the first and second card engaging/holding members 2 and 5 from both sides of it.

The card 1 is transported through a space (card transporting path) defined by an upper guide 10, a lower guide 11, a card base side 12, and a pressing plate 13. The guides 10 and 11, and the card base side 12 extend over substantially the entire length of the card transporting path. The pressing plate 13 extends over substantially the entire length of the carriage 3, and is rotatably mounted on the side surface of the carriage 3. The pressing plate presses the card 1 against the card base side 12 by an urging force of a coiled spring (not shown). The carriage 3 is disposed under the lower guide 11, and is slidably guided in the card transporting direction by two shafts 14 fixed to the card reader body.

At the time of inserting the card 1, the first card engaging/holding member 2, which is located closer to the card (this side in the left part of FIG. 1), is put at the stand-by position D by the card-drive member 4.

On the left side of the card transporting path in FIG. 1, a timing belt 15 extends around a couple of fixed pulleys 16 and 17, and idler pulleys 18 and 19. A gear 20 formed integral with the pulley 16 is in mesh with a gear 22 mounted on the motor 21, to thereby allow a drive force transmission.

An operation of the card transporting mechanism thus constructed will be described.

In a state that the card 1 is not taken into the card reader, the carriage 3 is located at the card entrance. At this position, the carriage 3 is fixed to the card reader body with a lock pin (not shown). Therefore, there is no chance that the carriage 3 is moved by vibrations of the card reader when it is carried and operated. In this state, the card 1 is taken into the card reader, and then the locking of the carriage by the lock pin is removed by a solenoid (not shown).

The card 1 is inserted into the card transporting mechanism in a direction C of an arrow and a sensor (not shown) detects the inserting card, and in turn the motor 21 starts to operate. A drive force of the motor 21 is transmitted to the timing belt 15, through the gear 22, the gear 20 and the fixed pulley 16, and then the timing belt 15 is turned counterclockwise in FIG. 1. As a result, the inserted card 1 is nipped between the timing belt 15 on the fixed pulley 18 and a pad assembly 23, and taken into the card transporting mechanism.

When a sensor (not shown) detects that the card has been taken into and reached a predetermined position, i.e., a position where the card is confronted with the carriage 3, in the card transporting mechanism, the motor 9 starts to rotate. A drive force of the motor 9 is transmitted through the pulley 7 to the card-drive member 4. When the card-drive member 4 is turned clockwise in FIG. 1 (in the direction A in FIG. 3), the engaging piece 6 which is provided on the card entrance side of the first card engaging/holding member 2 comes into engagement with the member 2, to thereby raise the member 2. Thus, the first card engaging/holding member 2 is moved to the card holding position D where it abuts on the protruded portion 3a of the carriage 3.

At this time, the second card engaging/holding member 5 is turned down by the engaging piece 6 which is provided on the card entrance side of the second card engaging/holding member 5, as shown in FIG. 3, and it is retracted to a position under the lower guide 11. That is, the second card engaging/holding member 5 is moved to the stand-by position G. In this state, the motor 9 further drives the card-drive member 4. Then, the card 1 and the carriage 3 are transported in the direction A since the first card engaging/holding member 2 has abutted on the protruded portion 3a of the carriage 3.

A magnetic head 24 (its support is not shown), which is mounted on the lower guide 11, reads out data from the card 1, and thereafter the motor 9 is reversed in its rotational direction to return the card 1 to the card entrance. At this time, the card-drive member 4 moves in the direction B of an arrow. Accordingly, the engaging pieces 6 of the first and second card engaging/holding members 2 and 5, which are located in the inner part of the card reader, turn the card engaging/holding members 2 and 5 as indicated by two-dot chain lines in FIG. 3. That is, the first card engaging/holding member 2 is retracted to the stand-by position E, and the second card engaging/holding member 5 is moved to the card holding position F. Accordingly, the holding of the card 1 by the first card engaging/holding member 2 is removed, while the second card engaging/holding member 5 engages and holds the card 1. Subsequently, with the movement of the card-drive member 4, the card 1 and the carriage 3 are transported to the card entrance.

And the card 1 is transferred to the timing belt 15, and discharged out of the card reader, through the card entrance. That is, the card-drive member 4 transports the card 1 till the card 1 is taken into the mechanism by the timing belt 15 put on the fixed pulley 16 and the pad assembly 23. At this time, the first card engaging/holding member 2 does not hinder the discharging of the card 1 since the first card engaging/holding member 2 has been moved to the stand-by position E.

When the card 1 is discharged from the inner part of the card reader, the card 1 is nipped between the timing belt 15 on the fixed pulley 17 and the pad assembly 25 and transported outside in this state.

In this card transporting mechanism, the card 1 can be firmly held or released from its holding state at a desired position within a slide range of the carriage 3 by merely changing the driving direction of the card-drive member 4 to the direction A or B since the driving direction change causes the card to turn the engaging/holding members 2 and 5. Therefore, when another card transporting path is branched at a middle of the card transporting path, the holding of the card may be removed at the path branching position only when the card 1 is transported through the branch transporting path. When the card 1 is not transported through the branch transporting path, the card 1 may pass the path branching position while being held. Thus, when another transporting path is additionally provided branching from the card transporting path or a receptacle for receiving used cards is provided, another transporting path may be branched at a desired position on the card transporting path. When the card is forcibly discharged manually, it may be discharged in a forward or backward direction at a desired position.

In the card transporting mechanism, for the movement of carriage 3, the carriage 3 is not moved until the first card engaging/holding member 2, which does not hold the card in a state that the card has been taken in, engages and holds the card. Therefore, there is eliminated a shift of the carriage 3 relative to the card 1. Further, such a problem that the mechanism for firmly holding the card 1 comes off is not created.

In the embodiment, the carriage 3 is driven such that it starts up at small inertia in the start-up stage of the motor 9, and it is moved when the motor is settled down in operation. Therefore, a time taken for the moving speed of the card 1 to reach a predetermined speed is reduced.

While the present invention has been described using a specific embodiment, it should be understood that the invention is not limited to the described one but may be modified, altered and changed within the true spirits of the invention. In the above-mentioned embodiment the invention is applied to the card reader (writer) with the magnetic head 24. However, it is evident that the invention may be applied to the card reader (writer) which handles magnetic/IC card readers (writers), or other devices.

Figure 8:
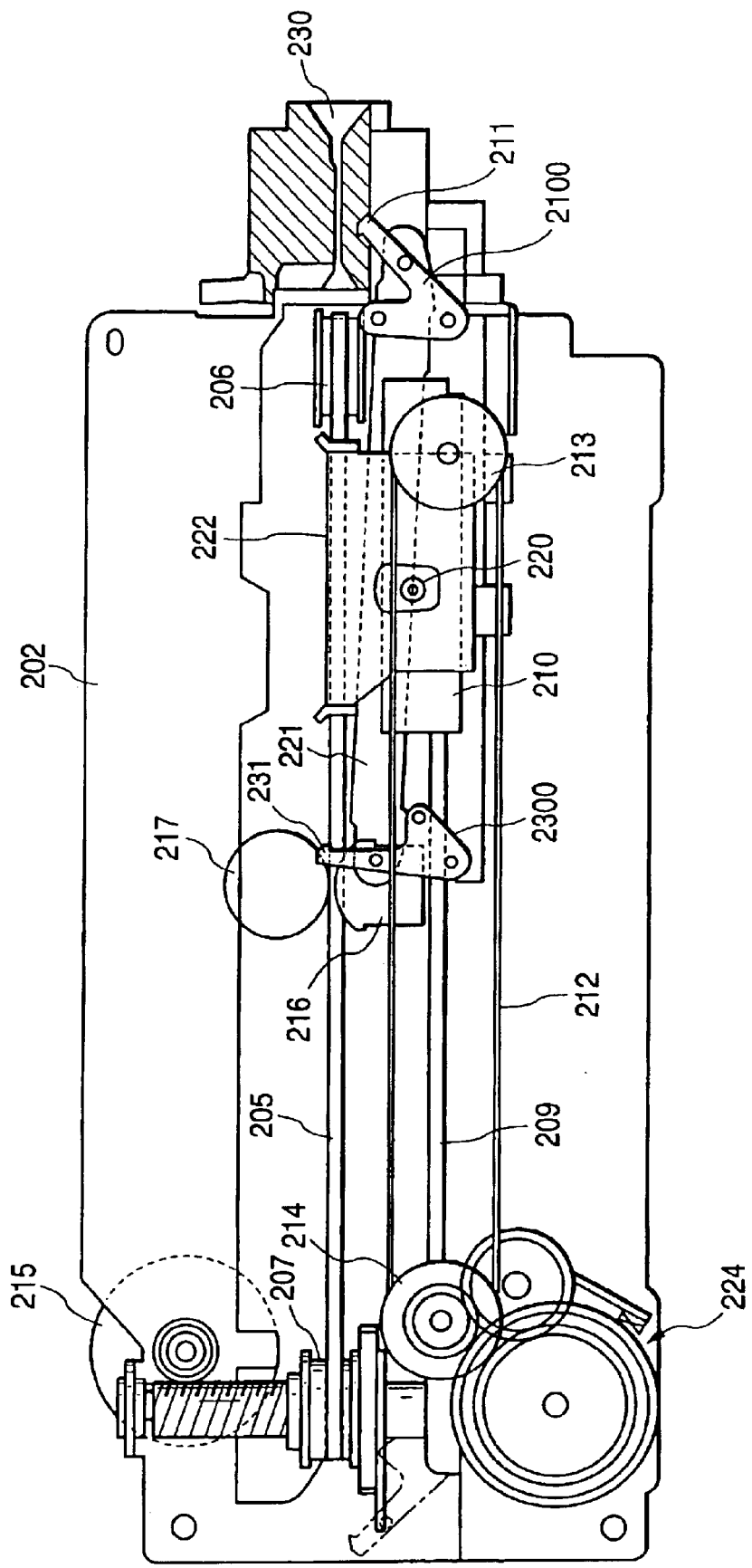
FIG. 8 is a side view showing the card discharging mechanism.

The distal end of each of the card engaging/holding members 2 and 5 may be shaped to have a stepped part 2b (a stepped part 5b is not shown) as shown in FIG. 8 (*5).

The pressing plate 13 may be omitted if the following mechanism is employed. That is, a pulley 26 in mesh with the timing belt 15 is attached to the carriage 3 with the aid of an arm 27, and the card 1 is pressed against the card base side 12 by use of the pulley 26. In this case, there is eliminated a friction load which will be created between it and the pressing plate 13 when the card is taken in.

Second Embodiment

Embodiments of a method and mechanism for forcibly discharging a card according to the present invention will be described with reference to the accompanying drawings.

In FIGS. 6 through 9, a card transporting path is defined by frames 201 and 202, which are laterally disposed parallel to each other while being spaced from each other by a predetermined distance, and an upper guide 203 and a lower guide 204, which are fixed to the top and bottom sides of the frames 201 and 202 while being parallel to each other. On one side (the left side when viewed from a card entrance 230) of the card transporting path, a timing belt 205 is supported on front and rear timing pulleys 206 and 207. A moving path of the timing belt 205 is changed by idle rollers 246 and 247, and the portions of the timing belt that are put on the timing pulleys 206 and 207 are confronted at only their parts (the card entrance and the card exit) with the card transporting path.

On the other side (the right side when viewed from the card entrance 230) of the card transporting path, pad rollers 208 and pad roller 228 are disposed at the front and rear ends of the card transporting path. The pad rollers 208 and 228 are rotatably supported in a horizontal plane at the distal ends of levers 226 and 227, respectively. The pad rollers 226 and 227 are angularly urged by means of coiled springs in such directions that the pad rollers 208 and 228 advance to the card transporting path. When the sensor detects that a card 250 is inserted into the card entrance 230, the timing pulleys 206 and 207 are driven to turn counterclockwise in FIG. 7, and at the same time, the timing belt 205 is driven. When the card is inserted, the leading end of the inserted card 250 has reached a position between the timing belt 205 that is put around the timing pulley 206 and the pad roller 208. Therefore, the card 250 is pressed against the timing belt 205 by the pad roller 208, and is transported to the inner part of the card reader by the timing belt 205 driven.

When the card 250 reaches a position between the timing belt 205 put on the timing pulley 207 which is located deep in the card reader, and the pad roller 228, the card 250 is pressed against the timing belt 205 by the pad roller 228 as in the previous case, and it is transported to the inner part of the card reader by the timing belt 205 driven. When the timing belt 205 is driven to turn in the reverse direction, the card 250 is transported in the card-discharging direction. Transporting means formed with the timing belt 205 and the pad rollers 208 and 228 will be referred to as first card transporting means. The transporting of the card by the first transporting means is performed at only the front part and the inner part of the card reader. In a part between the front part and the inner part, the card transporting is performed by second card transporting means to be described hereunder.

The second card is formed with a carriage 210, a wire 212, a slide lever 221, and pawls 211 and 231, a pressing member 222, and the like. As shown in FIG. 8, under the card transporting path, pulleys 213 and 214, which are rotatable in a vertical plane, are disposed at the front side position and the rear side position of the card reader. The wire 212 extends around those pulleys 213 and 214. A guide shaft 209 is fixedly provided extending in the stretching direction of the wire 212, viz., in the card transporting direction. A carriage 210 is provided such that it is movable along the guide shaft 209. A shaft 219 horizontally extends from a side surface of the carriage 210. A roller 220 is rotatably supported on the shaft 219. The roller 220 is put on a rail-like guide 218 fixed to the card reader body. Therefore, the carriage 210 is movable in the card transporting direction while being guided by the guide shaft 209 and the rail-like guide 218.

As shown in FIGS. 10 through 13, card-engaging pawl members (referred to as pawl members) 2100 and 2300 are supported at the front and rear ends of the carriage 210 such that those pawl members are rotatable about shafts 2104 and 2304 in vertical planes. The pawl members 2100 and 2300 are symmetrically disposed. Each of those pawl members consists of a bifurcated lever member having long and short arms. The long arms of those members are disposed such that the distal ends of those arms are oppositely disposed. Shafts 2102 and 2302 are respectively mounted on mid-positions of the long arms of the pawl members 2100 and 2300, and shafts 2103 and 2303 are mounted on the distal ends of the short arms of the pawl members. The shafts 2102 and 2103 of the pawl members 2100 and 2300 are inserted into longitudinally elongated holes 2216 and 2217 formed at the front and rear ends of the slide lever 221.

The slide lever 221 extends in the card transporting direction to greater length. A wire connection portion 2215 stands erect at the mid-position of the slide lever. The wire 212 is connected to the wire connection portion with the slide lever 221 being interposed in connection therewith. The front and rear ends of the slide lever 221 are each cut to open, so that each end is divided into two branches as viewed in the widthwise direction. The pawl members 2100 and 2300 are part inserted into those grooves, and are rotated while being guided by the grooves.

Figure 11:
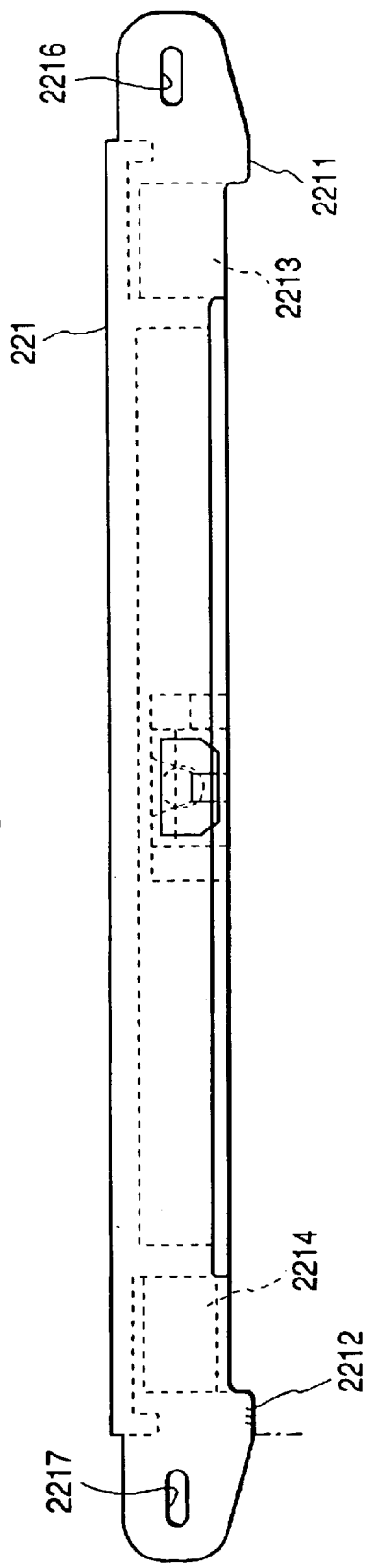
FIG. 11 is a side view showing a slide lever in the card discharging mechanism.
Figure 13:
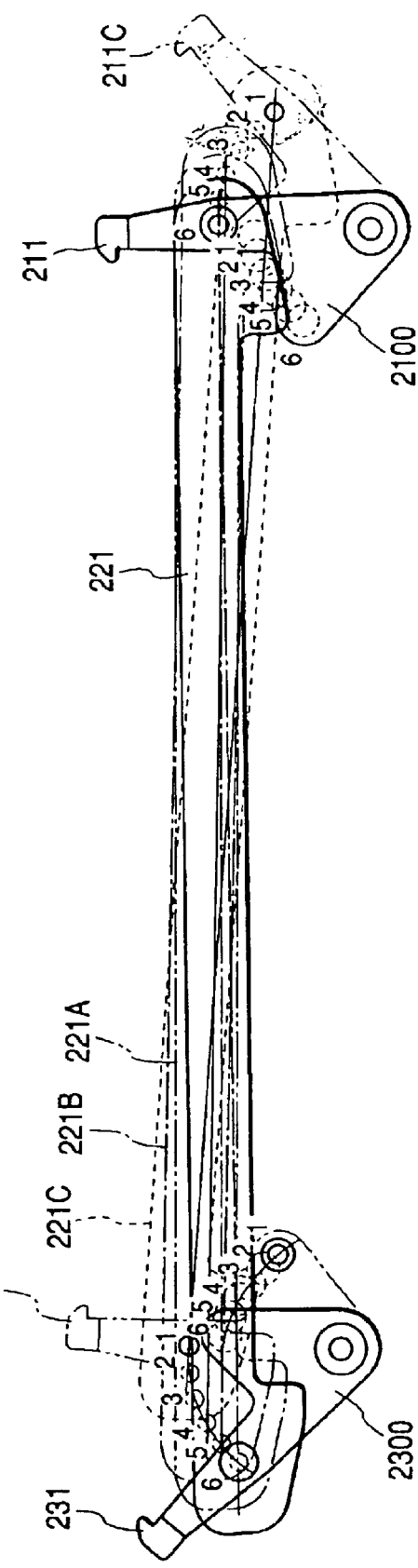
FIG. 13 is side view showing operations of the slide lever and a pawl member in the card discharging mechanism.

As shown in FIG. 11, the slide lever 221 includes the elongated holes 2216 and 2217. Further, the slide lever 221 includes cam-shaped stoppers 2211 and 2212 somewhat protruded downward from the front and rear ends of the slide lever, and relief portions 2213 and 2214 longitudinally and inwardly extending from the cam-shaped stoppers 2211 and 2212. The shafts 2103 and 2303, respectively, are somewhat protruded from the side surfaces of the pawl members 2100 and 2300, and the pawl members 2100 and 2300 are arranged so as to come in contact with the cam-shaped stoppers 2211 and 2212. The relief portions 2213 and 2214 are wider than the protruded parts of the shafts 2103 and 2303, respectively, to thereby allow the shafts 2103 and 2303 to advance to the relief portions 2213 and 2214.

Figure 12:
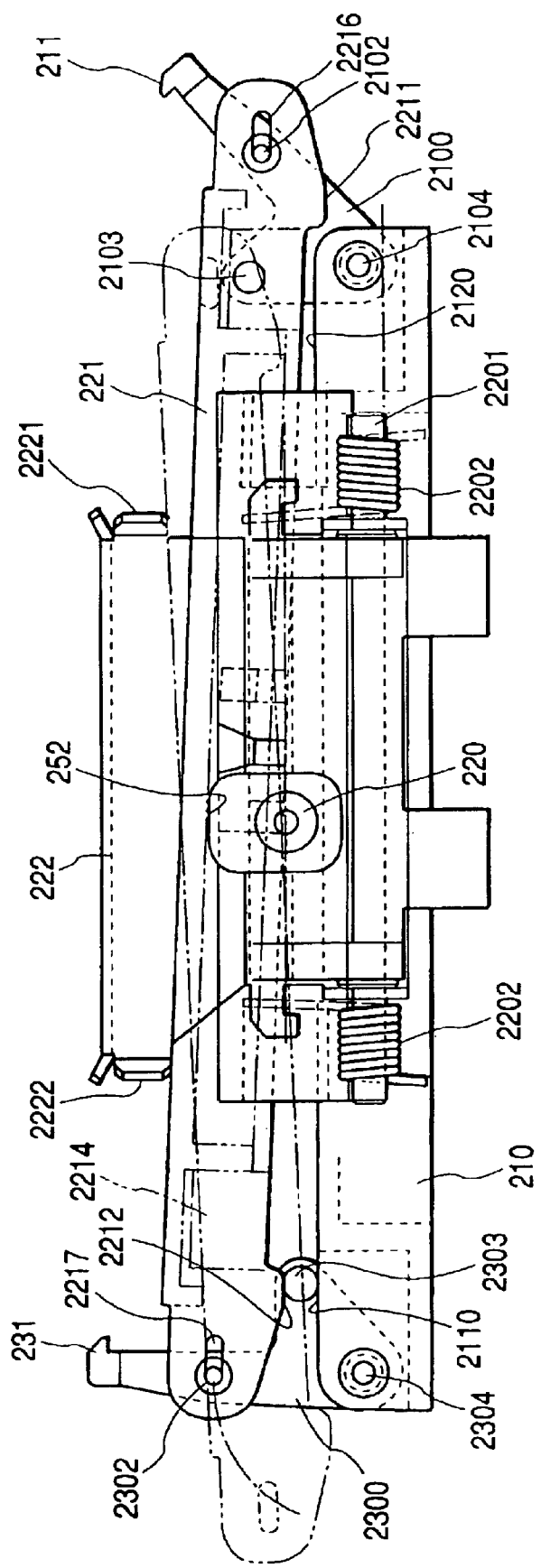
FIG. 12 is a side view showing a moving body in the card discharging mechanism.

A state of the card discharging mechanism shown in FIG. 12 is a state of the same in which the slide lever 221 is being pulled to the right, i.e., toward the card entrance 230, by the wire 212 or after it is pulled so. When the slide lever 221 is pulled to the right by the wire 212, only the slide lever 221 slides to the right within a range of the size of the elongated holes 2216 and 2217. Through the sliding of the slide lever 221, the cam-shaped stopper 2211 moves to the right from the shaft 2103 of the pawl member 2100 that has stood erect. The slide lever 221 further slides, so that the shafts 2102 and 2302 are pushed to the right at the edges of the elongated holes 2216 and 2217. The shaft 2102 is so pushed, so that the pawl member 2100 is turned clockwise and lays down. The shaft 2302 is pushed to the right through the sliding of the slide lever 221, so that the pawl member 2300 having laid down is turned clockwise to stand erect. The clockwise turn of the pawl member 2300 is stopped by a stopper 2110 of the carriage 210. At this time, the shaft 2303 moves under the cam-shaped stopper 2212 of the slide lever 221. Therefore, if an external force to turn the pawl member 2300 counter-clockwise is applied to the pawl member, the shaft 2303 comes in contact with the cam-shaped stopper 2212, whereby the turn of the pawl member 2300 is stopped.

Conversely, when the slide lever 221 is pulled to the left by the wire 212, only the wire 212 first slides to the left. Then, the pawl member 2100 is turned counterclockwise and the shaft 2103 raises up to a position where it comes in contact with a stopper 2120 of the carriage 210. At the same time, the pawl member 2300 lays down, and the shaft 2103 moves under the cam-shaped stopper 2211 of the slide lever 221. Therefore, if a force to turn the pawl member 2100 counterclockwise acts on the pawl member, the shaft 2103 comes in contact with the cam-shaped stopper 2211, whereby the turn of the pawl member 2100 is stopped. Thus, the pawl members 2100 and 2300 raise and lay down in accordance with the driving direction of the slide lever 221 in a reverse fashion, viz., when the pawl member 2100 raises, the pawl member 2300 lays down and vice versa. In a state that the pawl members 2100 and 2300 has raised, the pawls 211 and 231 advance to the card transporting path. In this state, the pawl members 2100 and 2300 move, and the pawl 211 or 231 comes in contact with the front end face or the inner end face of the card, to thereby transport the card to the card entrance or the inner part of the card reader. In a state that the pawl members 2100 and 2300 lay down, the pawls 211 and 231 move out of the card transporting path.

After the pawl members 2100 and 2300 rise and lay down in the reverse fashion, the slide lever 221 is still moved. Then, the carriage 210 is pulled through the actions of the pawl members 2100 and 2300, and the carriage 210, together with the slide lever 221, is moved along the rail-like guide 218.

The pressing member 222 is rotatably mounted on the carriage 210 by a shaft 2201 mounted on the side wall of the carriage 210. The frame 202 is horizontally supported in the card transporting direction on the side surface of the carriage 210. The pressing member 222 is supported in a state that it is rotatable about the center of the shaft 2201 in a vertical plane. The pressing member 222 extends to a certain length in the card transporting direction. The upper end edge of the pressing member 222 is confronted with the side surface of a card 50 (FIG. 6 to be transported. The front and rear ends of the upper edge of the pressing member 222 are formed as bent portions 2221 and 2222 bent outward as viewed from the card transporting path. Coiled springs 2202 are applied to both ends of the above shaft. Those coiled springs urges the pressing member 222 to turn in the clockwise direction in FIG. 6, viz., in a direction in which the upper end edge of the pressing member 222 presses the side surface of the card 250 on the card transporting direction. The other side of the card 250 that is pressed through the rotational urging operation of the pressing member 222 is pressed against a reference surface 260 consisting of a side surface of the frame 202.

Figure 9:
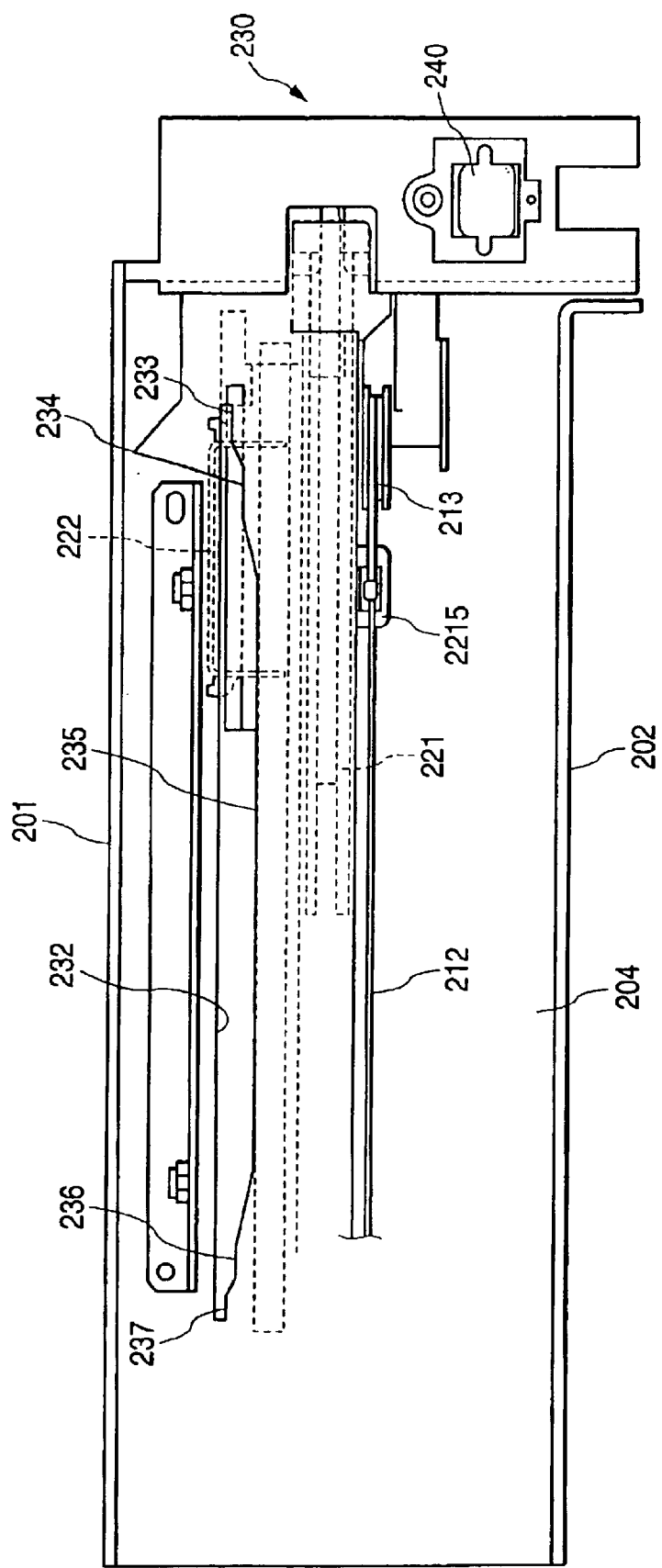
FIG. 9 is a bottom view showing the card discharging mechanism.
Figure 10:
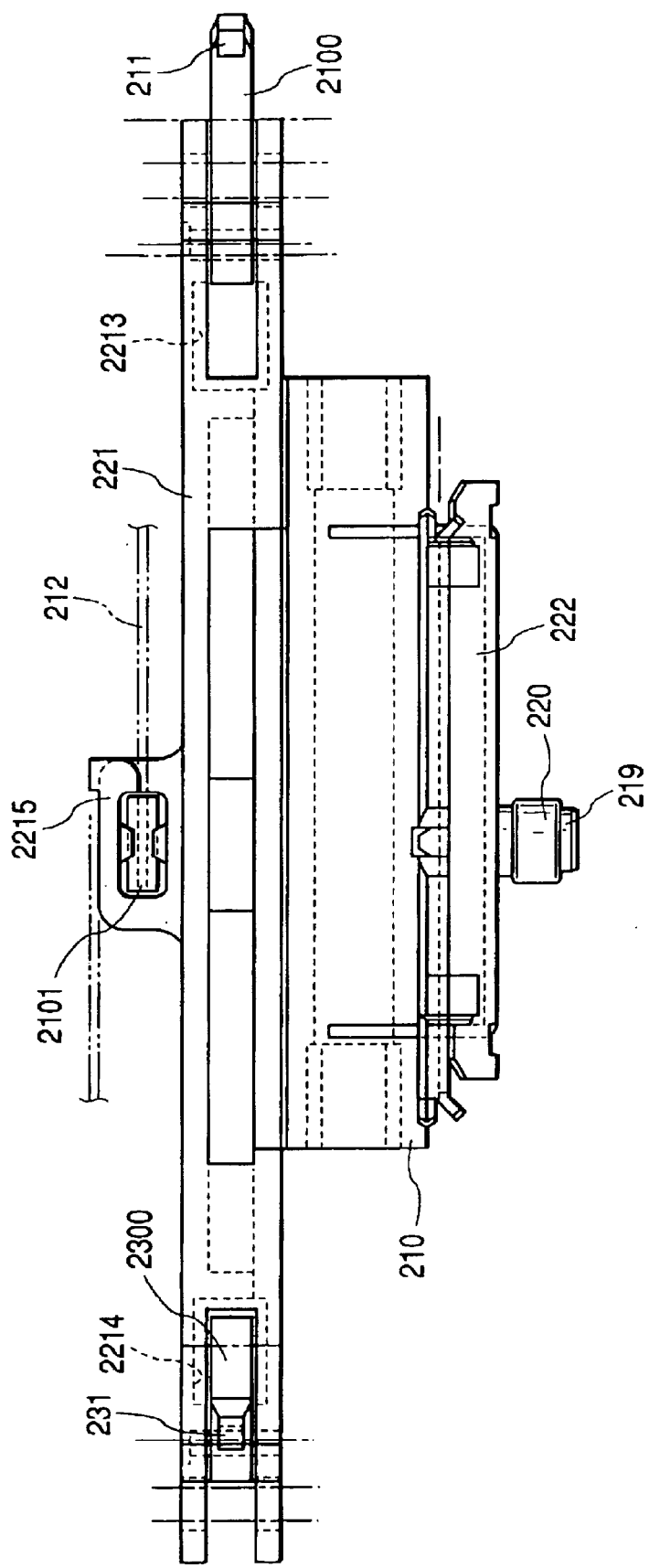
FIG. 10 is a plan view showing a moving body in the card discharging mechanism.

The pressing member 222, as shown in FIG. 9, stands upright through a slit-like window 232, which is formed in the lower guide 204. The window 232 is elongated in the card transporting direction. One side edge of the window 232 is linear in shape, and the other side edge is shaped to have a stepped cam face. This cam face will be described in detail. A shallow cam face 233, a medium-deep cam face 234 and a deep cam face 235 are formed on the front end side of the window 232 in this order. A shallow cam face 237, a medium-deep cam face 236 and a deep cam face 235 are also formed on the inner end side of the window 232 in this order. Accordingly, the cam shape of the front end side of the window 232 is symmetrical with the came shape on the inner end. Those cam faces are connected by slanted faces.

The turn of the pressing member 222 is stopped in a manner that it is brought into contact with one of the cam faces 2202 by the rotational urging force by the coiled springs or it is brought into contact with one side face of the card 250 on the card transporting path. In a state that a part of the pressing member 222 is in contact with the shallow cam face 233 or the shallow cam face 237, the pressing member 222 is pushed back while resisting the urging force, and it is separated from the card 250 on the card transporting path, as indicated by a two-dot chain line 222B in FIG. 8. In this state, the card 250 is transported by the first card transporting means formed with the pad roller 208 or the pad roller 228.

Figure 6:
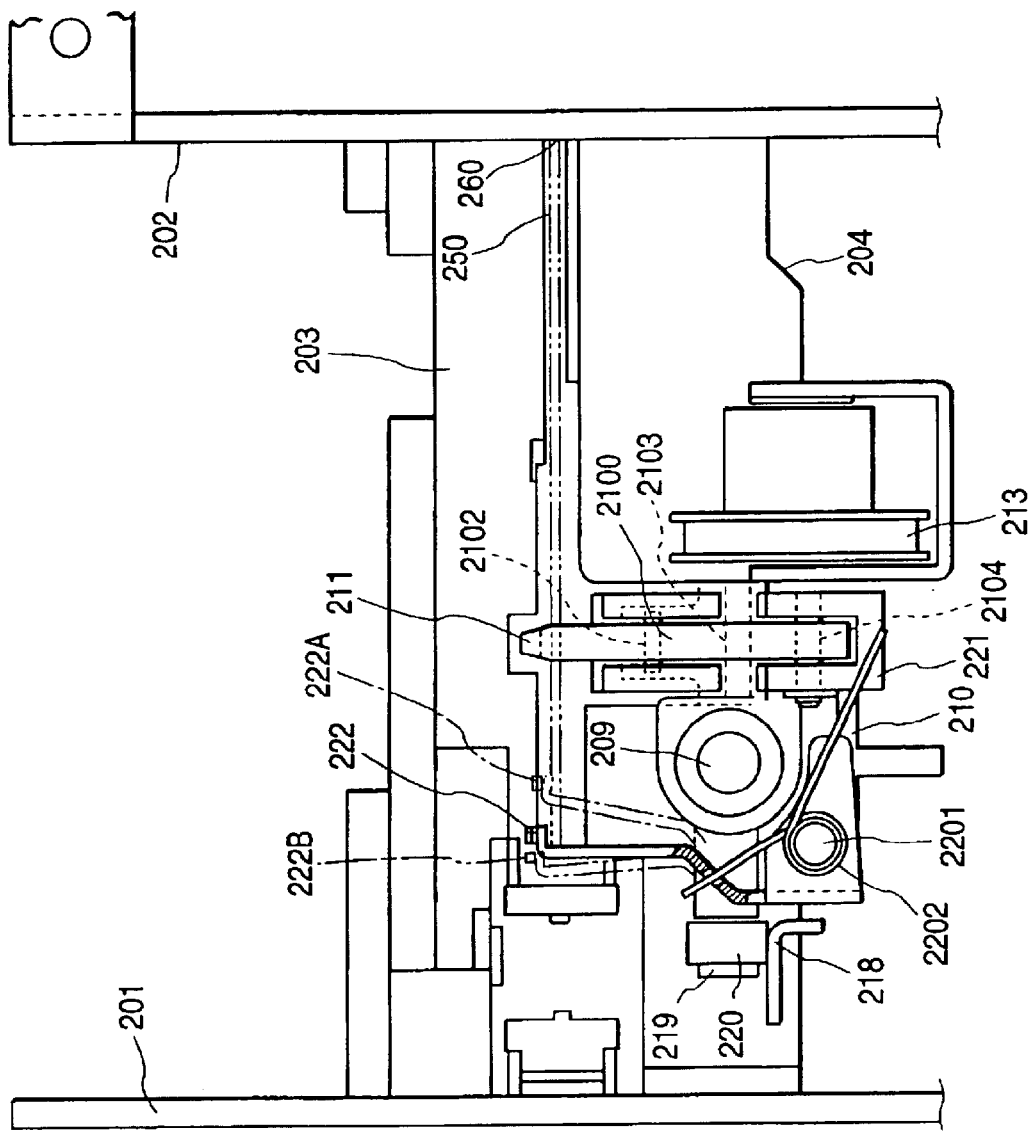
FIG. 6 is a front view showing a method and mechanism for forcibly discharging a card, which form an second embodiment of the present invention.

In a state that a part of the pressing member 222 faces the medium-deep cam face 234 or the medium-deep cam face 236, the pressing member 222 is at a rotation position indicated by a solid line in FIG. 6. At this position, the upper end edge of the pressing member 222 may come in contact with one side face of the card 250. At the position of the deep cam face 235, it comes in contact with the card and it is put at a position indicated by a solid line, and the card 250 is pressed against the reference surface 260. In a state that a part of the pressing member 222 is confronted with the deep cam face 235 and the card 250 is not present on the card transporting path, the pressing member 222 may advance to a rotation position indicated by a one-dot chain line 222A in FIG. 6. That is, when no card is present on the card transporting path, the pressing member 222 is greatly turned by the urging force, and its upper end edge may advance to the card transporting path.

Those may be formed with only the shallow cam faces 233 and 237 and the deep cam faces 235, while omitting the medium-deep cam faces 234 and 236. The roller 220, which is mounted on the carriage 210 with the shaft 219 interposing therebetween, passes through a window 242 (FIG. 12 formed in the pressing member 222 while having space enough.

As shown in FIG. 9, a magnetic head 240 for detecting magnetic data of the card inserted into the card entrance 230 is mounted on a position near the card entrance 230. An appropriate number of sensors for detecting the transporting card are provided also on the card transporting path.

As shown in FIG. 8, a head 216 for recording information on the recording tracks on the card and reading recorded information signals of the card, and a pad roller 217 for pressing the card 250 against the head 216 are provided at the central position of the card transporting path as viewed in the card transporting path.

The timing belt 205 and the wire 212 are driven by a single motor 215 as a drive source. The output shaft of the motor 215 is coupled to a reduction gear train 223, which is then coupled to a clutch mechanism 224. The clutch mechanism 224 on/off controls the transmission of power to the timing pulley 207 for driving the timing belt 205 or the pulley 214 for driving the wire 212. The rotational direction of the motor 215 is switched between a case where the card 250 is taken in and a case where the card is discharged.

An operation of the above-mentioned embodiment will be described. In an initial state in which the card is not yet inserted, the carriage 210 is located at the front position of its movable range. In this state, as shown in FIG. 12, the pawl member 2100 lays down and it is ready for receiving the card, and the pawl member 2300 stands upright. A part of the pressing member 222 supported by the carriage 210 comes in contact with the shallow cam face 233 shown in FIG. 9, and is pushed back while resisting the urging force and is out of the card transporting path as indicated by a two-dot chain line 222B in FIG. 6.

Figure 7:
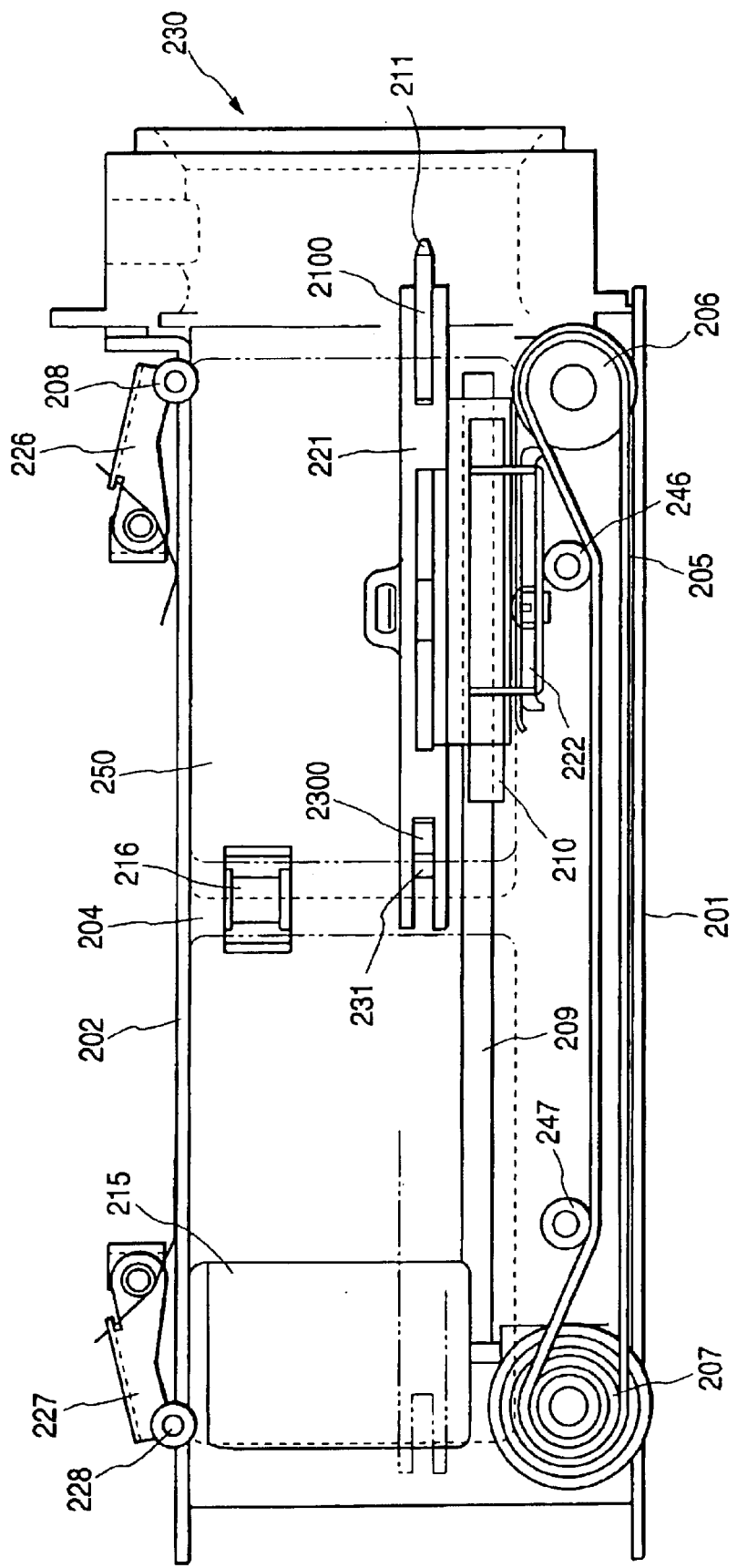
FIG. 7 is a plan view showing the mechanism for forcibly discharging a card in the first embodiment.

When the card 250 is inserted through the card entrance 230 in the initial state, the magnetic head 240 detects the card insertion, the motor 215 is driven to start, the pulley 7 is turned counterclockwise in FIG. 7 through the clutch mechanism 224, and the timing belt 205 is driven to turn. By the drive of the timing belt 205, the card 250 that is put between the timing pulley 206 and the pad roller 208 is transported to the inner part of the card reader.

When the card 250 is transported to a certain distance, the sensor (not shown) detects the card, and the clutch mechanism 224 drives the wire 212 instead of the wire 212. By the drive of the wire 212, the slide lever 221 is pulled to the left in FIGS. 8 and 10. As a result, the slide lever 221 shifts its position to a position indicated by a solid line through the positions indicated by a two-dot chain line 221A, a one-dot chain line 221B and a broken line 221D. In an initial stage of the operation of the slide lever 221, only the slide lever 221 moves within the range defined by the elongated holes 2216 and 2217. As the result of the movement, the cam-shaped stopper 2212 moves apart from the shaft 2303 of the pawl member 2300. The slide lever 221 further slides, and the shafts 2102 and 2302 are pulled to the left at the right end edges of the elongated holes 2216 and 2217, the pawl members 2100 and 2300 are turned about the shafts 2104 and 2304 counterclockwise in FIG. 12 and 13, the pawl member 2100 rises perpendicularly, and the pawl member 2300 lays down. At this time, the shaft 2303 of the pawl member 2300 moves to the relief portion 2214 of the slide lever 221.

As the result of standing upright of the pawl member 2100, the pawl 211 advances to a position where it may come in engagement with the front end face of the card 250 on the card transporting path. When the slide lever 221 further slides, the right end edges of the elongated holes 2216 and 2217 come in contact with the shafts 2102 and 2302, and the shaft 2103 fixedly planted in the pawl member 2100 comes in contact with the stopper 2120 of the carriage 210, so that the carriage 210 is pulled. The carriage 210, the pressing member 222 mounted on this carriage, and the pawl members 2100 and 2300 are moved to the inner part of the card reader. Shortly after the pressing member 222 starts to move, the contact of a part of it with the shallow cam face 233 (FIG. 9) ends, it faces the next cam face 234, the pressing member 222 is turned by the urging force, the upper end edge of the pressing member 222 having been out of the card transporting path pushes one side face of the card 250 on the card transporting path, and the other side face of the card 250 is pressed against the reference surface 260.

With further sliding of the slide lever 221, the carriage 210 and the pressing member 222 also move to the inner part, and a part of the pressing member 222 is confronted with the deep cam face 235 shown in FIG. 9. While the card 250 is present on the card transporting path, further turn of the pressing member 222 by the urging force is not performed. Since the pawl member 2100, while standing erect, moves together with the slide lever 221, the pawl 211 pushes the front end face of the card 250 to move it to the inner part. At this time, an external force to turn the pawl member 2100 clockwise in FIGS. 12 and 13 exerts when the pawl member 2100 pushes the card 250. However, the shaft 2103 comes in contact with the cam-shaped stopper 2211 of the slide lever 221 to stop its turn, whereby the standing-erect posture of the pawl member 2100 is held. During the card transporting by the pawl 211, the pressing member 222 also moves while pressing the card 250 against the reference surface 260, with the transportation of the card 250. During this operation, the head 216 reads out information from the recording track of the card and writes information into the same.

The pressing of the card 250 against the reference surface 260 by the pressing member 222 is removed in a manner that the pressing member 222 comes in contact with the deep cam face 235, the medium-deep cam face 236, and the shallow cam face 237 (in FIG. 9), and it is rotated while resisting the urging force. With the removal of the pressing, the sliding of the slide lever 221 by the wire 212 is stopped. Instead, the timing belt 205 is driven, and the card 250 having reaching the nip between the pad roller 228 and the timing pulley 207 is further moved to the inner part by the driven timing belt 205, and subjected to a predetermined process. At this time, the pawl member 2300 is in a lay-down posture as described above, so that it does not hinder the transportation of the card 250 by the timing belt 205 in any way.

When the processed card 250 is discharged, the operation is performed in the reverse order. To be specific, the card 250 is first transported to the card entrance 230 by the driven timing belt 205 in cooperation with the pad roller 228. After it reaches a limit position in a transporting region by the timing belt 205, the slide lever 221 is slid toward the card entrance 230 by the wire 212. In an initial stage of the sliding of the slide lever 221, the slide lever 221 only slides. Thereafter, the pawl member 2100 lays down, the pawl member 2300 rises, and the slide lever 221 is further slid. As a result, the carriage 210, the pressing member 222, and the pawl members 2100 and 2300 are also moved to the card entrance 230.

The pawl member 2300 moves while standing erect, and its pawl 231 comes into engagement with the inner-side end face of the card 250. And the card 250 is moved toward the card entrance 230. At this time, the pressing member 222, while pressing the card 250 against the reference surface 260, moves toward the card entrance 230, together with the carriage 210 and the card 250. When it reaches the end of the transporting region by the pawl member 2300, a part of the pressing member 222 comes in contact with the shallow cam face 233, and it moves apart from the card transporting path. Thereafter, the timing belt 205 is driven, and it cooperates with the pad roller 208 to discharge the card 250 to the card entrance 230.

The operation of the card discharging mechanism thus far described is that when the mechanism is normal. There is a case where when the card is greatly deformed or soiled, the card is transported not normally. After the card has been into the card entrance, it is impossible to take out the inserted card. In this case, the card is forcibly discharged. The description to follow is elaboration of an operation of the card transporting mechanism for forcibly discharging the card. When a greatly deformed or soiled card or a card of which the normal transportation is impossible is inserted through the card entrance 230, such a card stays in the car transporting path inside the card entrance. The magnetic head 240 located near the card entrance 230 detects the incoming card, but the sensor located within the card sensor located in the card reader cannot detect the card until it reaches a card sensor position. To cope with a case that the magnetic head 240 located near the card entrance 230 detects a card, but another sensor does not detect the card after a predetermined time elapses after the card insertion, or that another sensor (not shown) outputs a signal and its outputting state continues for a predetermined time, it is judged that the card stays at the card entrance, and an abnormal detecting signal indicative of the staying card is output.

The wire 212 is driven, by the abnormal detecting signal, to move the carriage 210, the pressing member 222, and the pawl members 2100 and 2300 to the inner part of the card reader; it is sufficiently moved such that the front end 2221 of the pressing member 222 is located at a position deeper than the inner-side end face of the staying card. Subsequently, the wire 212 is driven in the reverse direction, to thereby move the carriage 210, the pressing member 222, the pawl members 2100 and 2300 toward the card entrance 230. During the movement, a part of the pressing member 222 stands facing the deep cam face 235 shown in FIG. 9, and the pressing member 222 is put in a state that it is rotatable by the urging force. At this time, the card remains in the vicinity of the card entrance 230. Accordingly, the card is not present at a position where it faces the upper end edge of the pressing member 222, and the pressing member 222 is greatly turned as indicated by a one-dot chain line 222A in FIG. 6 and advances to the card transporting path while vertically crossing the card transporting path.

In this state, the pressing member 222, together with the carriage 210, is further moved toward the card entrance 230. And the upper end of the pressing member 222 comes in contact with the inner-side end face of the staying card to push it, whereby the card is forcibly moved back to the card entrance 230. When the pressing member 222, together with the carriage 210, moves to the front end of the moving region, a part of the pressing member 222 comes in contact with the shallow cam face 233 to assume its initial posture.

Figure 14:
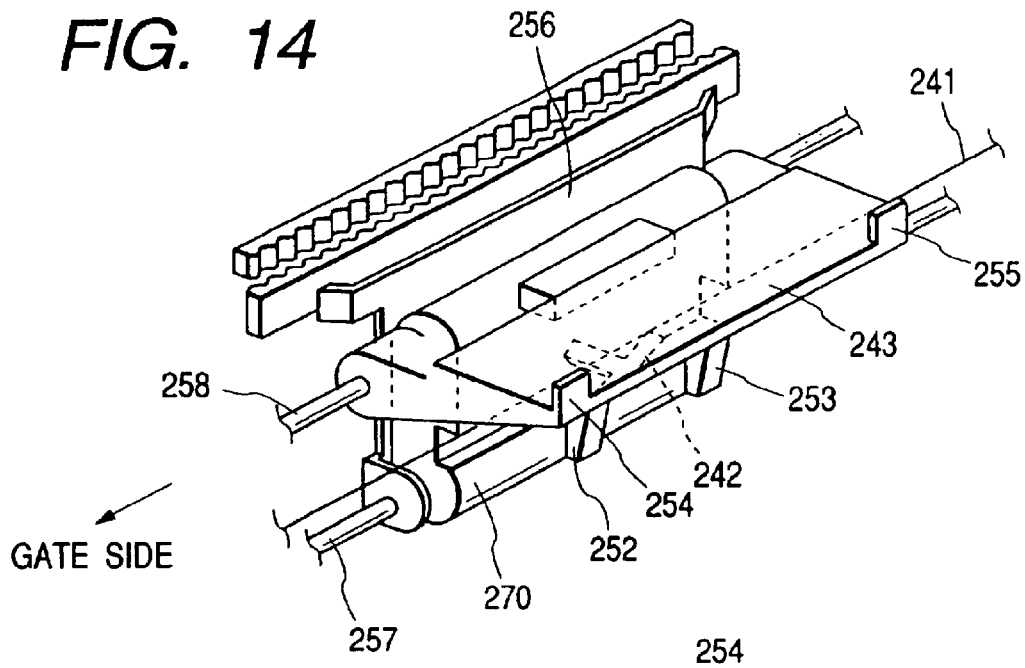
FIG. 14 is a front view showing a forcibly card-discharging method and a card discharging mechanism, which form another embodiment of the present invention.
Figure 15:
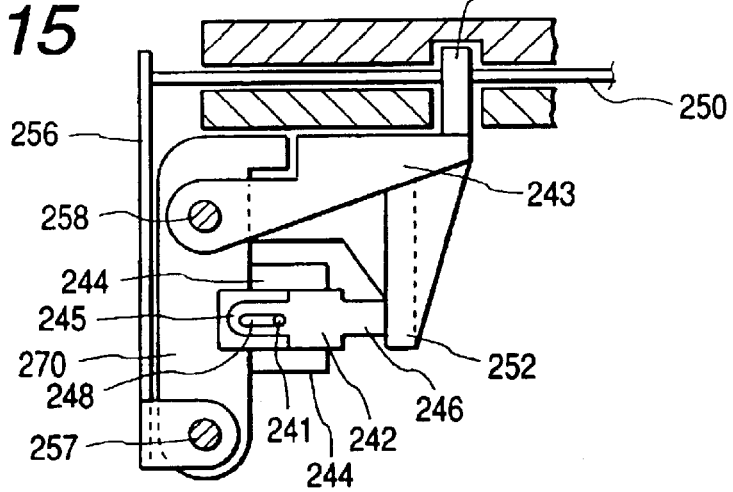
FIG. 15 is a side view showing the card discharging mechanism of the second embodiment.
Figure 16:
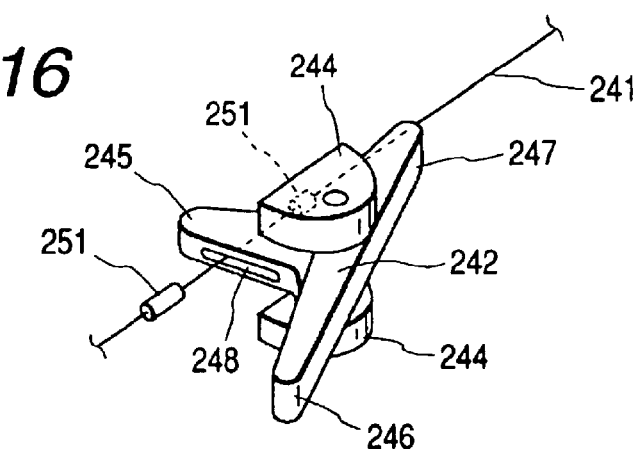
FIG. 16 is a perspective view showing a drive lever in the second embodiment.

Another embodiment of the present invention shown in FIGS. 14 to 16 will be described. In this embodiment, a pawl member 243, which is used commonly for the forward and backward card transportation, is driven by a lever 242 which is turned by a wire 241 as a movement drive member. In FIGS. 14 to 16, the lever 242 is rotatably supported by a bracket 244. The lever 242 includes three arms 245, 246 and 247. The wire 241 is passed through an elongated hole 248 formed in the first arm 245, and the lever 242 is substantially horizontally turned to swing its first arm 245, by engaging pieces 251 provided on the wire 241. The second and third arms 246 and 247 of the lever 242 are arranged so as to come into contact with tapered arms 252 and 253 of the pawl member 243. When the lever 242 is turned, the arms 246 and 247 push upward the tapered arms 252 and 253 of the pawl member 243, and the engaging pieces 254 and 255 of the pawl member 243 advance to the card transporting path.

To move the card 250 along the card transporting path forward or backward, the engaging pieces 254 and 255 of the pawl member 243 are first advanced to the card transporting path, and then a carriage 270 is then moved.

In a state that the card is located between the engaging pieces 254 and 255, the engaging pieces 254 and 255 hold the card 250, and hence the carriage 270 is moved. To stop the wire 241, a motor as a drive source (not shown) is not locked, but the lever 242 is returned to its original position by the utilization of the weight of the pawl member 243, whereby the engaging pieces 254 and 255 are retracted from the card traveling path. Reference numeral 256 designates a pressing plate, and numerals 257 and 58 designate guide shafts for guiding the movement of the carriage 270. The guide shaft 258 designates a rotational center of the pawl member 243.

In the embodiment shown in FIGS. 14 to 16, the carriage 270 is moved to the inner part of the card reader, and its moving direction is reversed to move the card toward the card entrance, whereby a card staying on the card transporting path is forcibly discharged by the engaging pieces 254 and 255 of the pawl member 243 for card transportation.

The pressing plate 256 functions like the pressing member 222 in the above-mentioned embodiment. That is, it moves while pressing the card against the reference surface, with the transportation of the card. When the card stays in the card transporting path, it is turned into the card transporting path and pushes the inner-side end face of the staying card. Accordingly, the pressing plate 256 is also capable of forcibly discharging the card.

In the above-mentioned embodiments, a forcibly card discharging method and a forcibly card discharging mechanism, which are capable of forcibly discharging a card which remains on the card transporting path, are realized by the utilization of a card transporting mechanism indispensably incorporated into the card reader and by merely changing somewhat the mechanism. Specifically, the cam face for stopping the rotation of the pressing member 222 by the urging force is enlarged, thereby increasing a rotational range of the pressing member 222. When the card stays on the card transporting path, the pressing member 222 is moved to the inner part, and it is moved in the reverse direction. The pressing member 222 is advanced into the card transporting path by the turn of the pressing member 222 caused by the urging force when the pressing member is moved so, whereby the card is forcibly discharged by the pressing member 222. Therefore, the forcibly card discharging mechanism is realized at low cost without any additional mechanism and parts, and size reduction of a card reader with a card transporting mechanism is realized.

The card can be forcibly discharged by use of the engaging pieces for transporting the card. The engaging pieces 229c are also originally assembled into the card transporting mechanism. In this sense, the useful effects mentioned above are obtained.

Third Embodiment

Figure 17:
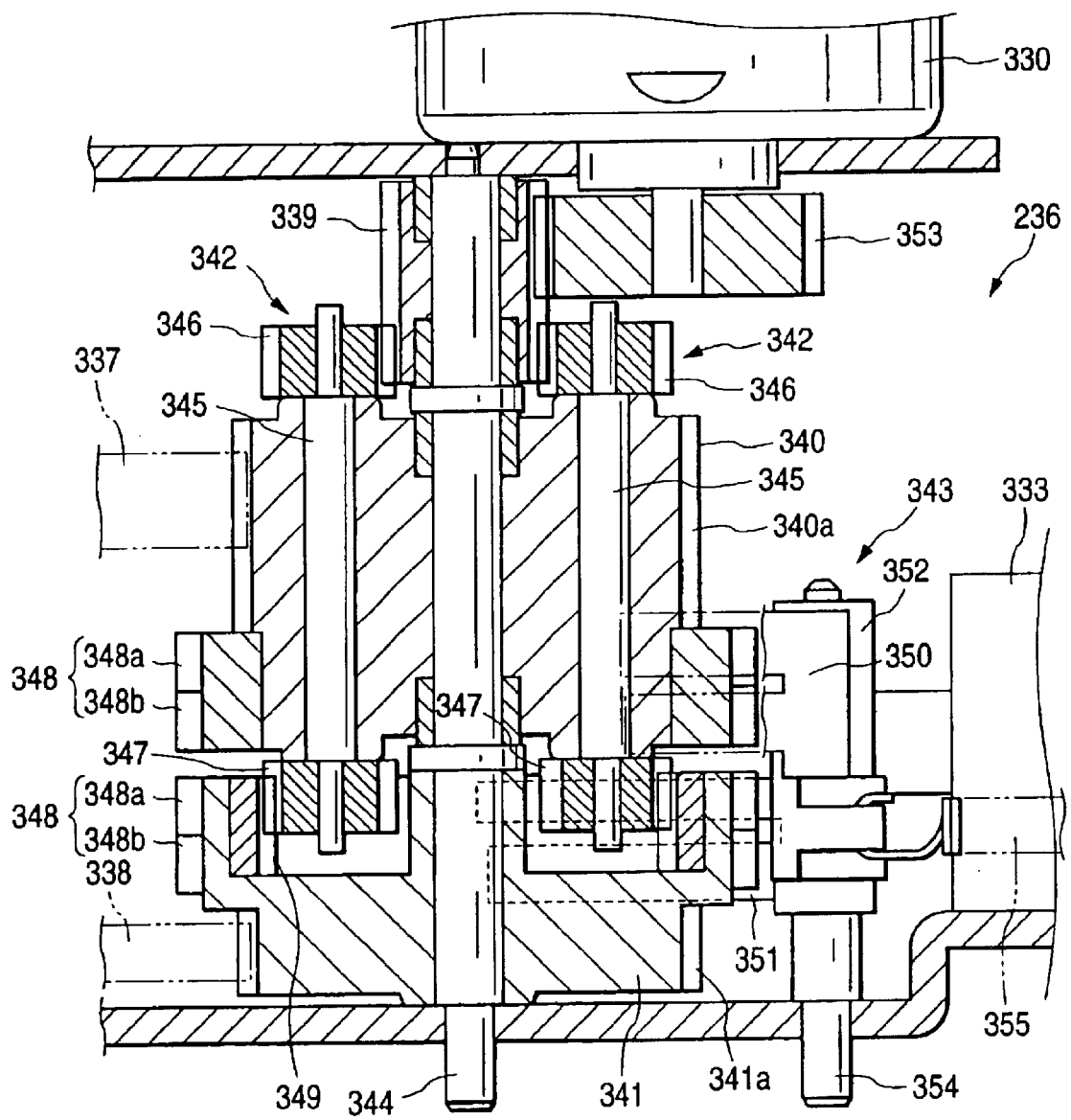
FIG. 17 is a cross sectional view showing a third embodiment of a drive-force transmission mechanism according to the present invention.
Figure 18:
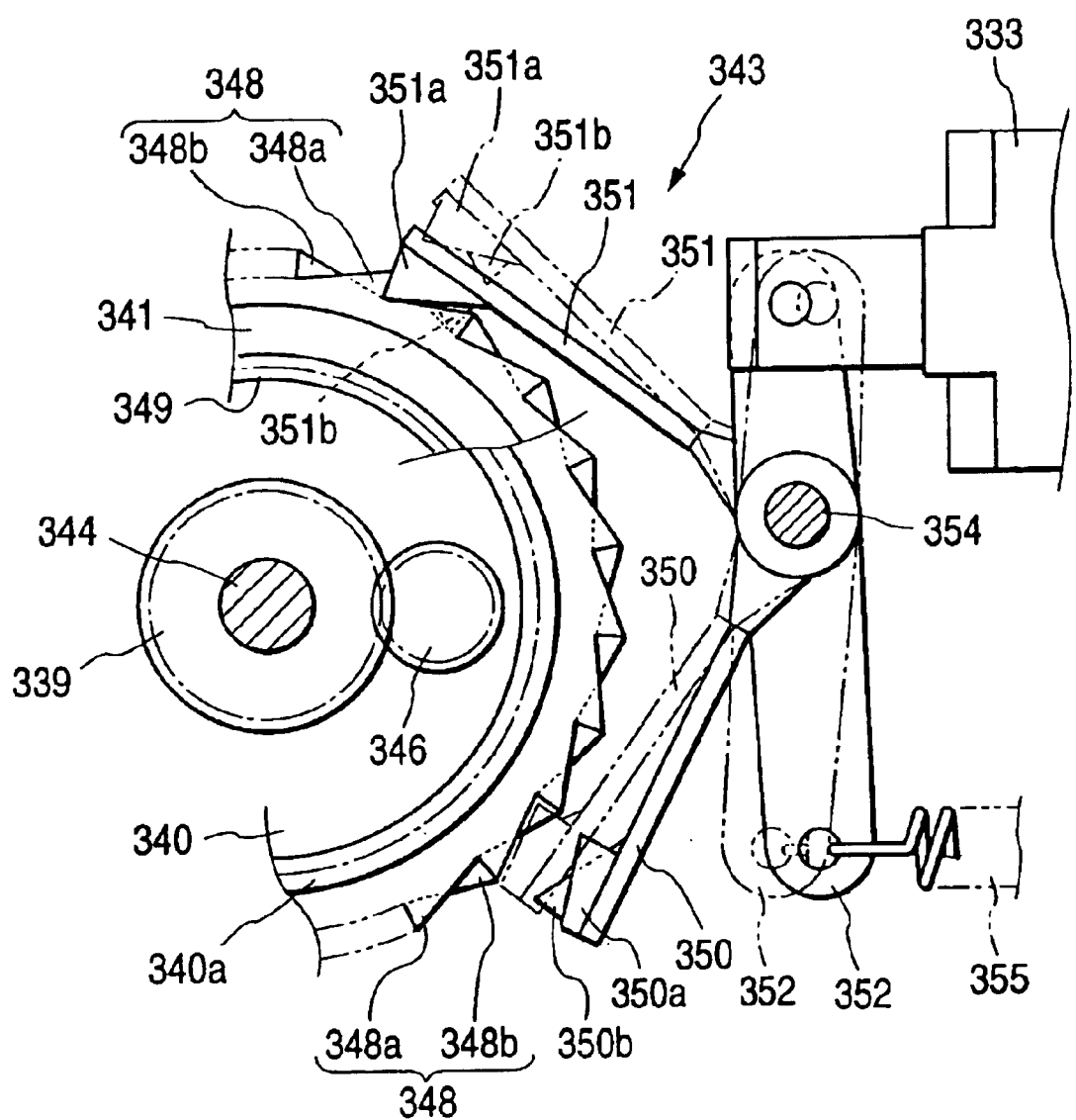
FIG. 18 is an enlarged view showing in detail selective engaging/stopping means in the drive-force transmission mechanism.
Figure 19:
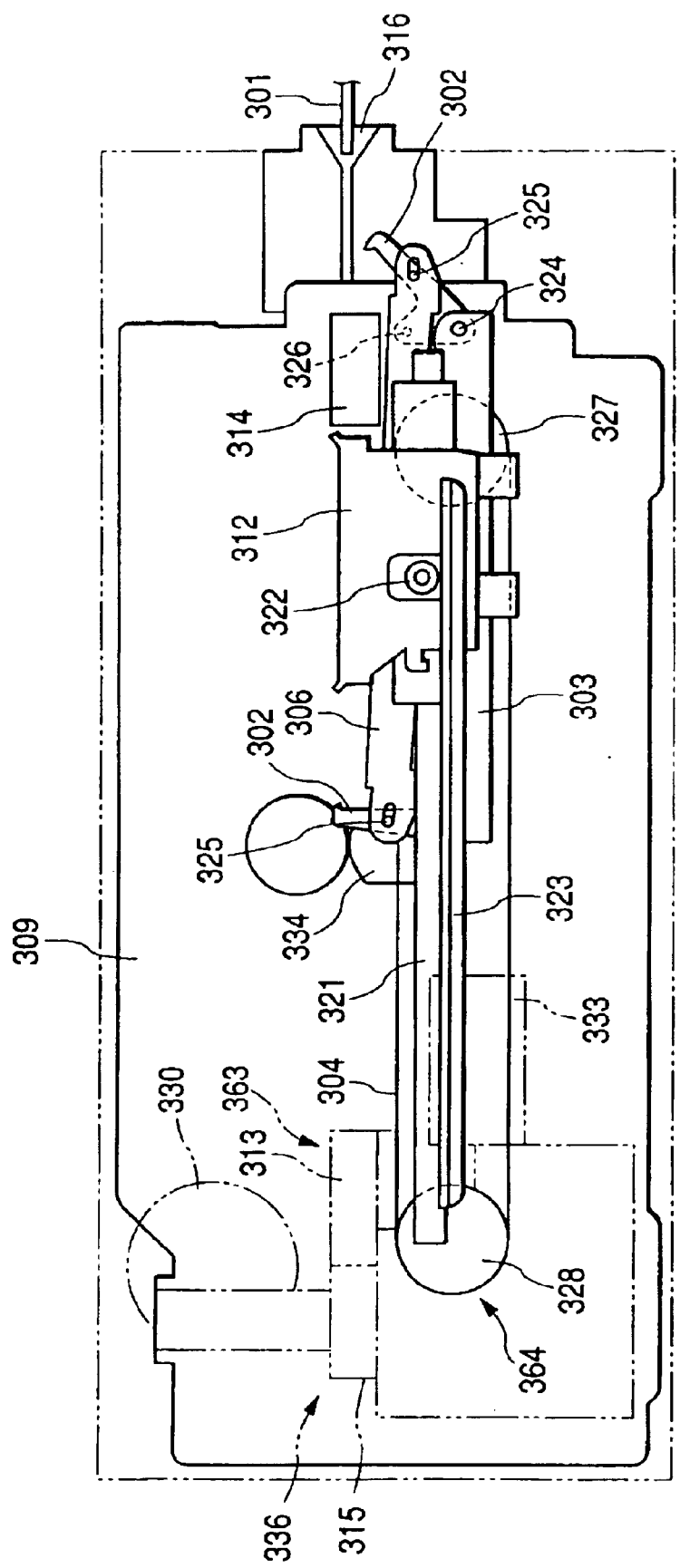
FIG. 19 is a side view schematically showing relative positions of components in a card reader having a card transporting mechanism incorporated therein, which is constructed according the present invention.
Figure 20:
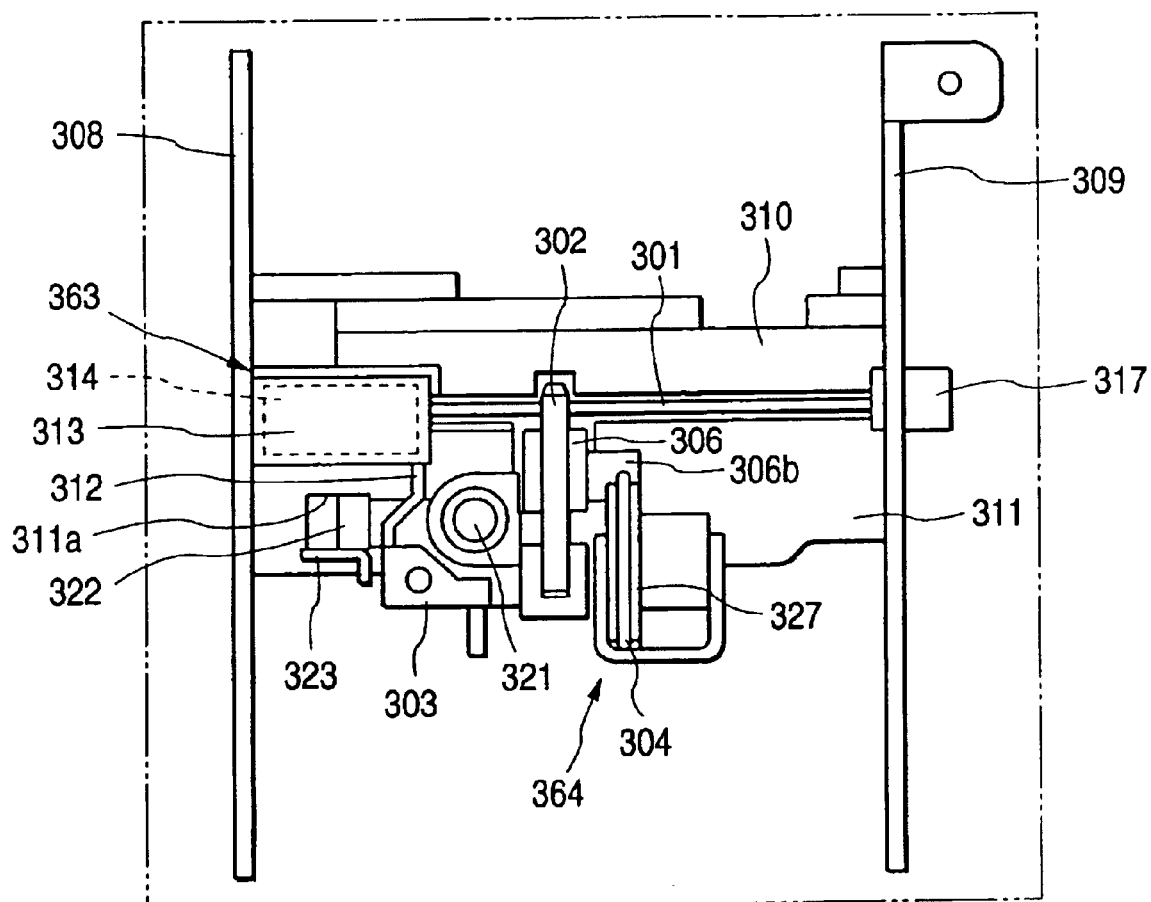
FIG. 20 is a front view showing relative positions of the components in the card reader.
Figure 21:
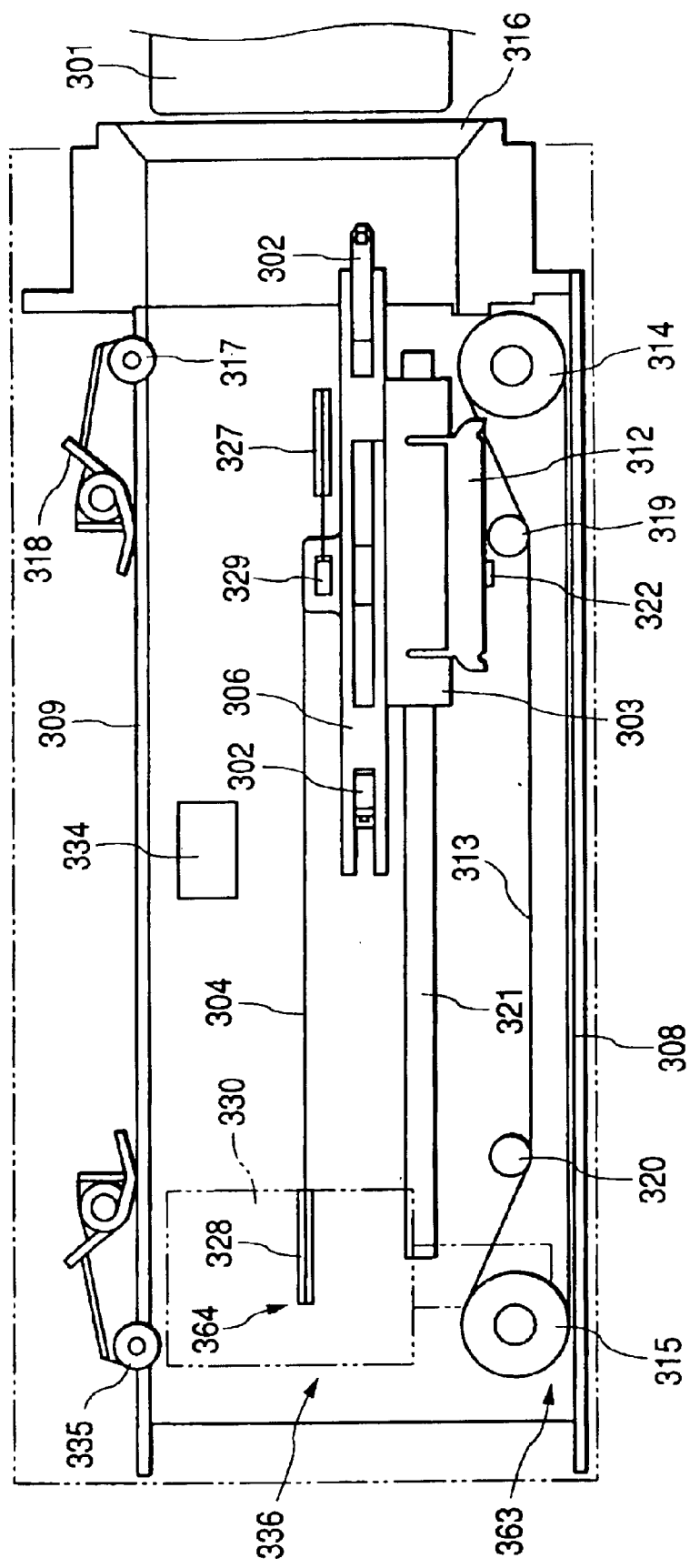
FIG. 21 is a top view showing relative positions of the components in the card reader.

A drive-force transmission mechanism constructed incorporating the present invention is shown in FIGS. 17 through 18. A drive-force transmission mechanism 336 illustrated is arranged so as to selectively transmit a rotation of a motor 330 to one of two drive systems 337 and 338. A first follower-side rotational gear 340 and a second follower-side rotational gear 341 are coaxial with a drive-side rotational gear 339 rotated by the motor 330. A planetary gear member 342, which is in mesh with the drive-side rotational gear 339 and the second follower-side rotational gear 341, is attached to the first follower-side rotational gear 340. Selective engaging/stopping means 343 is provided for selectively engaging and stopping the first follower-side rotational gear 340 or the second follower-side rotational gear 341. The drive system 337 and another drive system 338 are coupled to the first follower-side rotational gear 340 and the second follower-side rotational gear 341, respectively.

In the embodiment, the drive-side rotational gear 339, the first follower-side rotational gear 340 and the second follower-side rotational gear 341 are provided on a single shaft 344 in a juxtaposing fashion. The planetary gear member 342 includes two planetary gears 346 and 347, which are mounted on both ends of shafts 345 rotatably held at eccentric positions of the first follower-side rotational gear 340. Latch portions 348 stopped by the selective engaging/stopping means 343 and a gear portion 340a for drive transmission are provided around the first follower-side rotational gear 340. The second follower-side rotational gear 341 includes an internal gear (gear portion) 349 which is in mesh with the planetary gear 347, and it includes the latch portions 348 latched by the selective engaging/stopping means 343 and a gear portion 341a for drive transmission, which are disposed around it. The selective engaging/stopping means 343 includes a rotational member 352 which is provided with two engaging members 350 and 351, which may engage two latch portions latch portions 348. It is turned by a solenoid 333.

A rotation of a motor 30 is transmitted to the drive-side rotational gear 339, through a spur gear 339. The drive-side rotational gear 339 is rotatably supported on the shaft 344. The first and second follower-side rotational gears 340 and 341 are rotatably supported on the shaft 344. Two shafts 345 pass through the first follower-side rotational gear 340 at the eccentric positions, while being symmetrically disposed with respect to the shaft 344. The planetary gears 346 and 347 are fixed to both ends of each of the shafts 345. The planetary gear 346 fixed to one end of each shaft 345 is in mesh with the drive-side rotational gear 339, and the planetary gear 347 fixed to the other end is in mesh with an internal gear 249 of the second follower-side rotational gear 341.

The latch portions 348 consists of two lines of latches 348a and 348b of which the teeth are oriented in directions opposite to each other. The distal end of each of the engaging members 350 and 351, which come into engagement with the latch portions 348, is bifurcated. Engaging pawls 350a and 350b, which engage the latch portions 348, are provided on the bifurcated ends of the engaging member 350, and engaging pawls 351a and 351b, which engage the latch portions 348, are provided on the bifurcated ends of the engaging member 351. The engaging pawls 350a and 350b are oriented in directions opposite to each other so that for the reverse directional rotations, one of the pawls is caught in the teeth with certainty. The same thing is true for the engaging pawls 351a and 351b. Thus, the engaging member 350 includes the engaging pawls 350a and 350b, which may engage the latch portions 348, and similarly the engaging member 351 includes the engaging pawls 351a and 351b, which may engage the latch portions. Accordingly, when the engaging members 350 and 351 engage the latch portions 348, the first and second follower-side rotational gears 340 and 341 are prohibited from rotating in a first direction since the engaging pawls 350a and 350b are caught in the latches 348a. Those gears are prohibited from rotating in a second direction since the engaging pawls 350b and 351b are caught in the latches 348a. The distal end of each engaging member is bifurcated. Therefore, the engaging pawls 350a and 350b are separated from each other. The engaging pawls 351a and 351b are also separated from each other. Accordingly, if one of the engaging pawls is vertically displaced, its displacement does not affect the other engaging pawl. In other words, if one of the engaging pawls 350a and 351a is vertically displaced, the other engaging pawl 350b or 351b does not put out of the latching by latch. Therefore, the selective engaging/stopping means 343 reliably locks both the forward and reverse rotations of the first follower-side rotational gears 340 and 341.

The engaging members 350 and 351 are mounted on the rotational member 352, which is supported on a shaft 354 in a swingable fashion, and are driven by the rotational member 352. When the solenoid 333 is turned on, the engaging member 350 corresponding to the first follower-side rotational gear 340 engages the latch portions 348 of the first follower-side rotational gear 340, while the engaging member 351 corresponding to the second follower-side rotational gear 341 comes off the latch portions 348 of the second follower-side rotational gear 341. On the other hand, when the solenoid 333 is turned off, the rotational member 352 is returned to its original position by a return spring 355. The engaging member 350 corresponding to the first follower-side rotational gear 340 comes off from the latch portions 348 of the first follower-side rotational gear 340, and the engaging member 351 corresponding to the second follower-side rotational gear 341 engages the latch portions 348 of the second follower-side rotational gear 341.

In the drive-force transmission mechanism 336, when the solenoid 333 is in an off state, selective engaging/stopping means 313 locks the second follower-side rotational gear 341. Therefore, a rotation of the motor 330 is transmitted to the first follower-side rotational gear 340. That is, the rotation of the motor 330 is transmitted through the following route: spur gear 353→drive-side rotational gear 339→planetary gear 346 of the planetary gear member 342→shafts 345→planetary gear 347. Since the planetary gear 347 engages the internal gear 349 of the second follower-side rotational gear 341 being locked, it rolls along the internal gear 349. Therefore, the planetary gear member 342 moves around the shaft 344 while revolving on its axis, and causes the first follower-side rotational gear 340 to turn. The drive system 337 is coupled to the gear portion 340a of the first follower-side rotational gear 340, so that a rotational force of the motor 330 is transmitted to the drive system 337.

When the solenoid 333 is turned on, the engaging/stopping means 343 locks the first follower-side rotational gear 340, and removes the locking of the second follower-side rotational gear 341. For this reason, the planetary gear member 342 cannot revolve around the shaft, and it revolves on its axis, and it causes the second follower-side rotational gear 341 to rotate through the internal gear 349. The drive system 338 is coupled to the gear portion 341a of the second follower-side rotational gear 341, whereby a rotation of the motor 330 is transmitted to the drive system 338.

Thus, the rotational force output of the motor 330 may be selectively transmitted to the first follower-side rotational gear 340 or the second follower-side rotational gear 341 by merely swinging the rotational member 352 by the solenoid 333. This indicates that size and weight reduction of the drive-force transmission mechanism 336 is realized. The solenoid 333 may be used for the actuator. Further, the solenoid 333 is energized only when the output power is taken out of the second follower-side rotational gear 341. This indicates that power consumption of the drive-force transmission mechanism 336 is reduced. The solenoid 333 as the actuator is inexpensive, and hence use of the solenoid 333 brings about manufacturing cost reduction.

Figure 24:
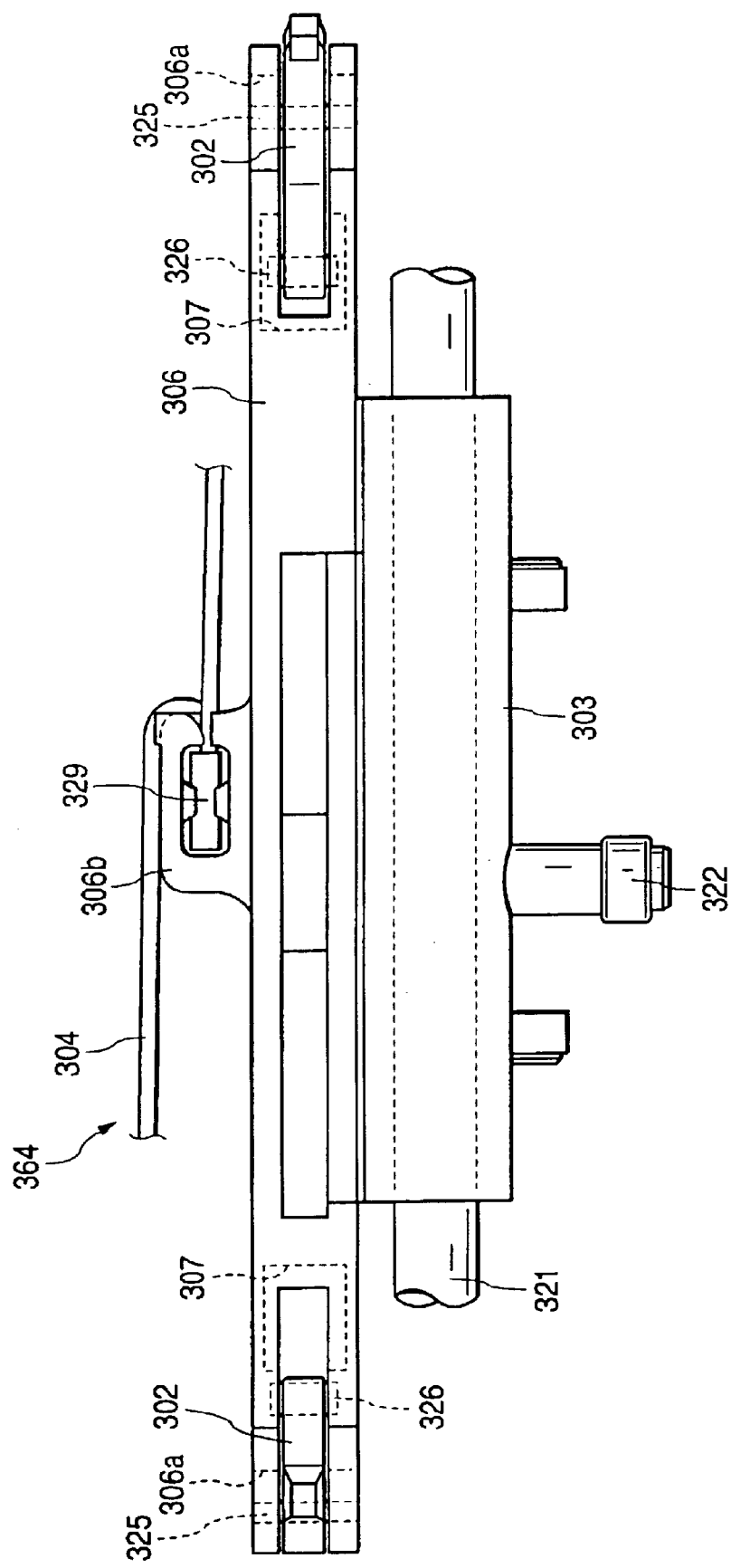
FIG. 24 is a plan view showing the card-transporting drive means.
Figure 25:
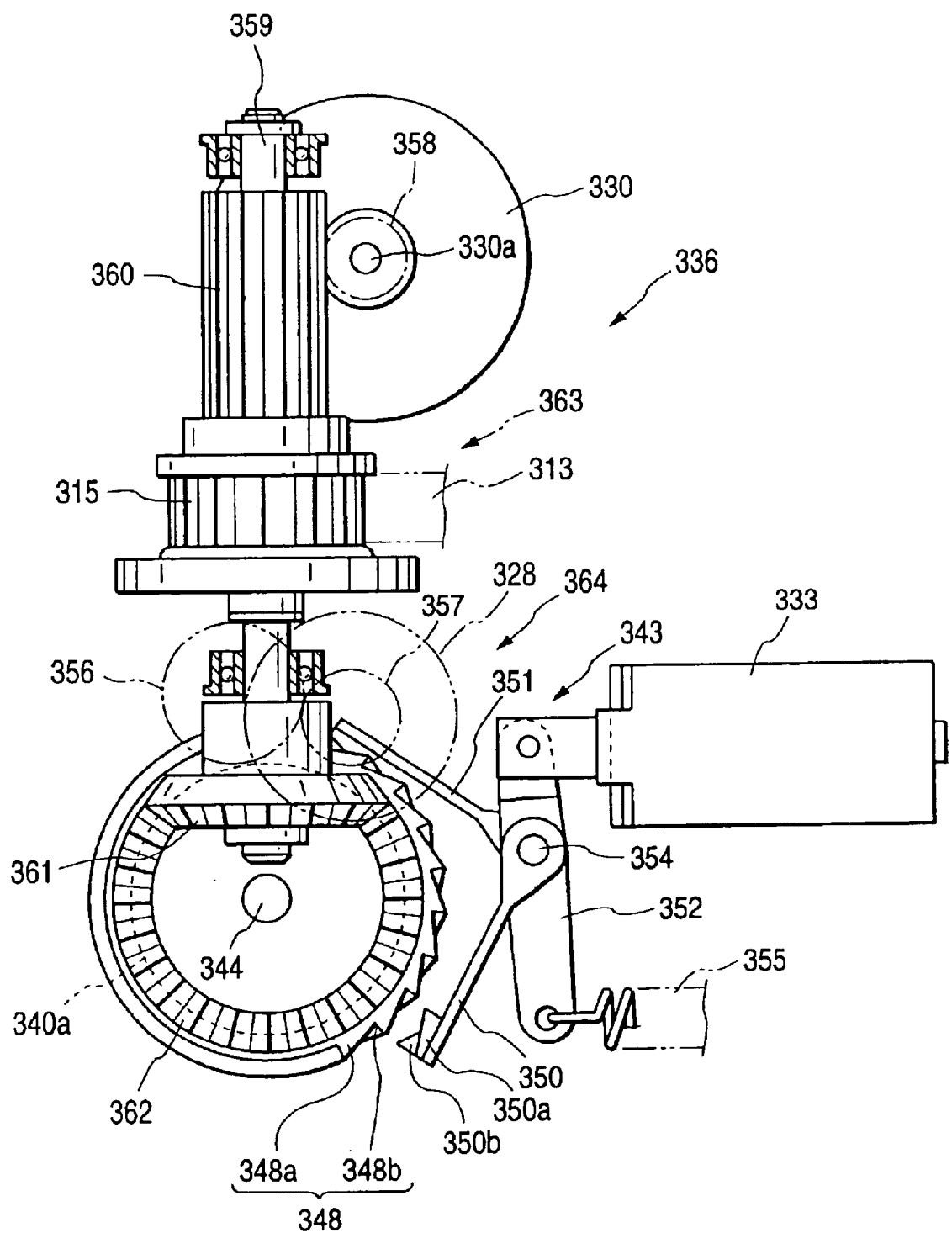
FIG. 25 is a side view showing a drive-force transmission mechanism used in the card reader of FIG. 19 (*3).
Figure 26:
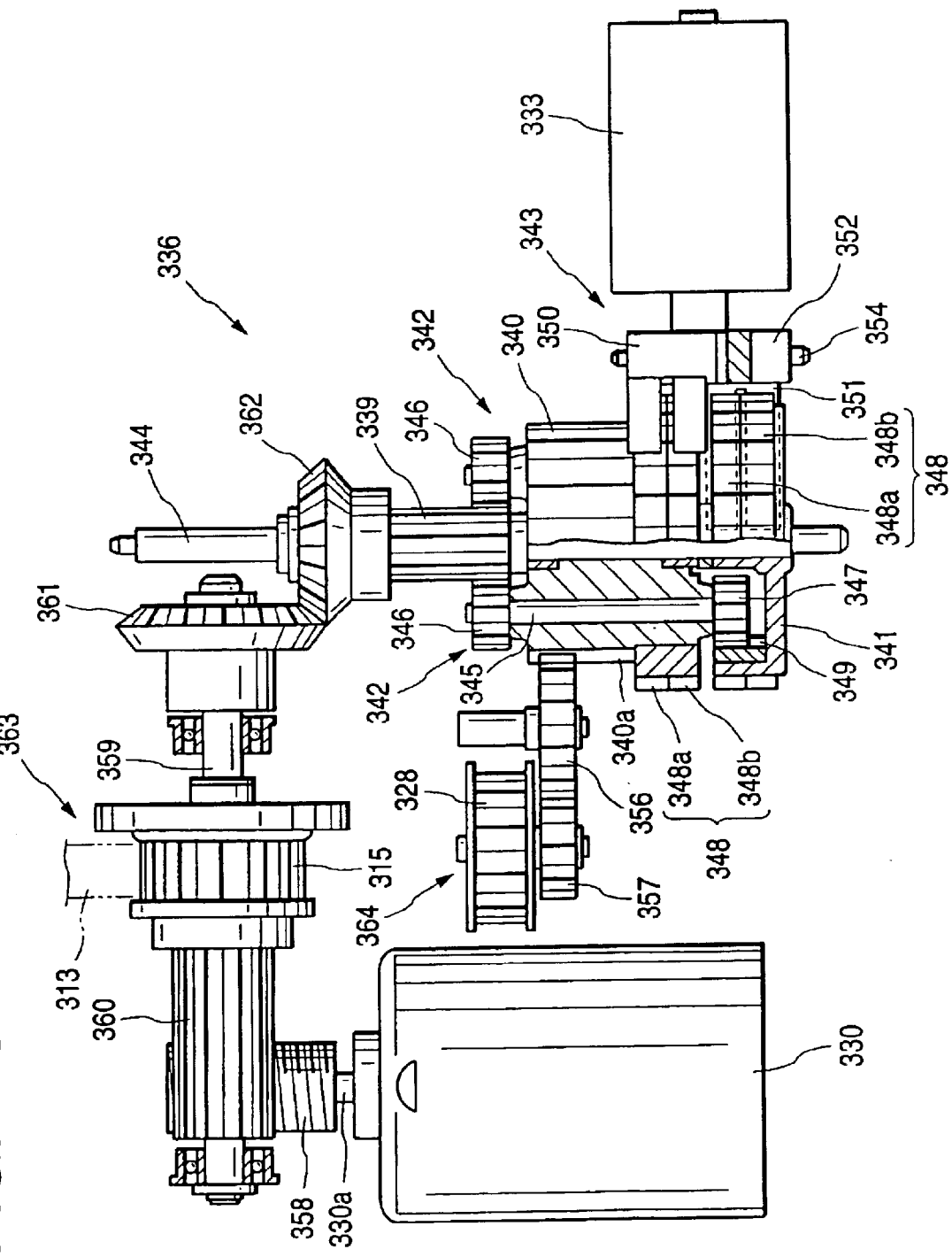
FIG. 26 is a development showing the drive-force transmission mechanism.
Figure 30:
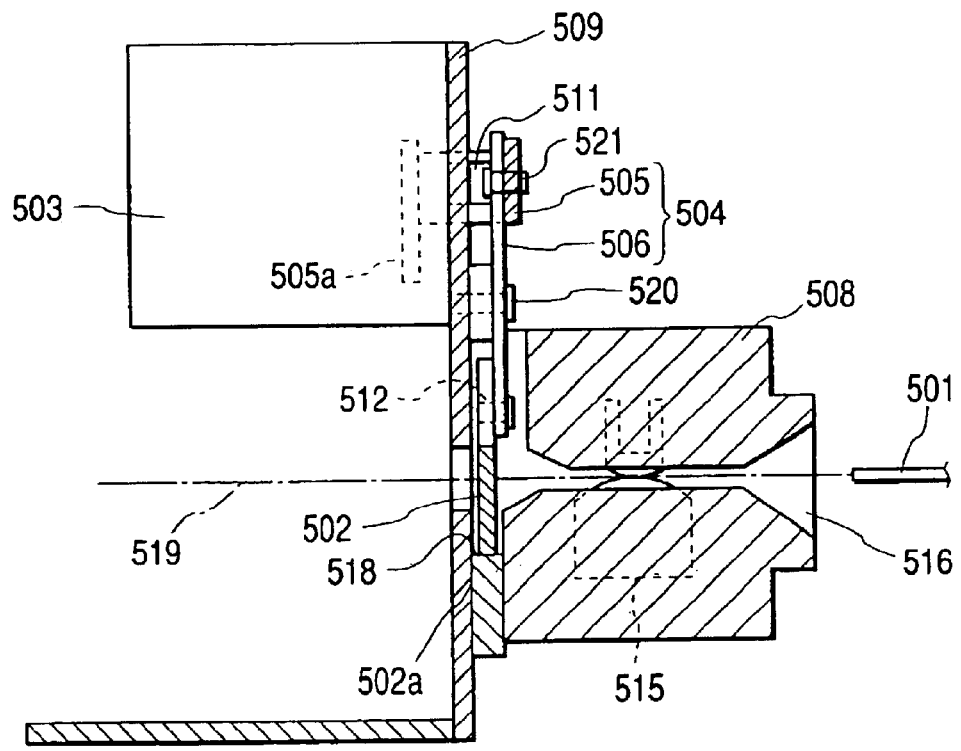
FIG. 30 is a cross sectional view showing how to close a card transporting path by a shutter plate of the shutter opening/closing mechanism.
Figure 31:
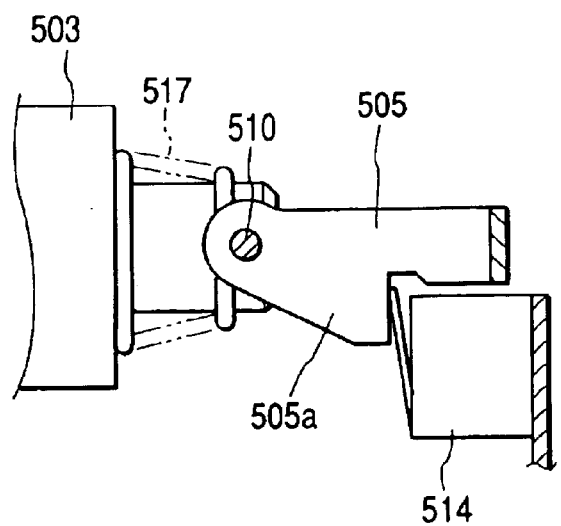
FIG. 31 is view schematically showing a mechanism for detecting a closing position in the shutter opening/closing mechanism.

Next, a card transporting mechanism using the drive-force transmission mechanism 336 mentioned above will be described. An instance in which the card transporting mechanism is applied to a card reader (writer) for a magnetic card is shown in FIGS. 19 to 24, and a card transporting mechanism which is applied to the card reader is shown in FIGS. 25 to 26.

The card transporting mechanism is arranged such that a rotation of the motor 330 is selectively transmitted to one of two drive means 363 and 364 in the card taking-in and discharging operations and the card transporting operation. First and second follower-side rotational gears 340 and 341 are provided coaxial with a drive-side rotational gear 339 rotated by a motor 330. A planetary gear member 342, which engages the drive-side rotational gear 339 and the second follower-side rotational gear 341, is mounted on the first follower-side rotational gear 340. Selective engaging/stopping means 343 is provided for selectively engaging and stopping one of the first follower-side rotational gear 340 and the second follower-side rotational gear 341. Drive means 364 for card transportation is coupled to one of the first and second follower-side rotational gear 340 and 341.

In the embodiment, drive means 364 for card transportation includes a card transporting member 302 which comes in contact with the trailing end 301a of a card 1 to move the card 1. Card taking-in/discharging drive means 363 moves the inserted card to a position where the card transporting member 302 comes in contact with the trailing end 301a of the trailing end 301.

The card transporting members 302 are provided at two front and rear locations of a carriage 303. The card transporting member 302 located closer to the trailing end face 301a of the card 301 as viewed in the card traveling direction is at a card stop position P1, and the card transporting member 302 closer to the leading end face 301b of the card 301 is at a retract position P2. That is, in FIG. 22, when the card 301 is moved to the right, the left card transporting member 302 is at the card stop position P1, and the right card transporting member 302 is at the retract position P2 (indicated by a solid line). When the card 301 is moved to the left, the right card transporting member 302 is at the card stop position P1 and the left card transporting member 302 is at the retract position P2 (indicated by a two-dot chain line).

The two card transporting members 302, which are located at the two positions, viz., the front and rear positions of the card transporting member 302, are interlocked by an interlocking member 306, which is coupled to a transportation drive member 304, so that those card transporting members are turned concurrently. In the embodiment, the interlocking member 306 consists of a single lever, and a moving portion 307 for moving the card transporting members 302 and a blocking portion 305 are provided on the lever (referred to as a slide lever 306) while corresponding to the two card transporting members 302.

Figure 22:
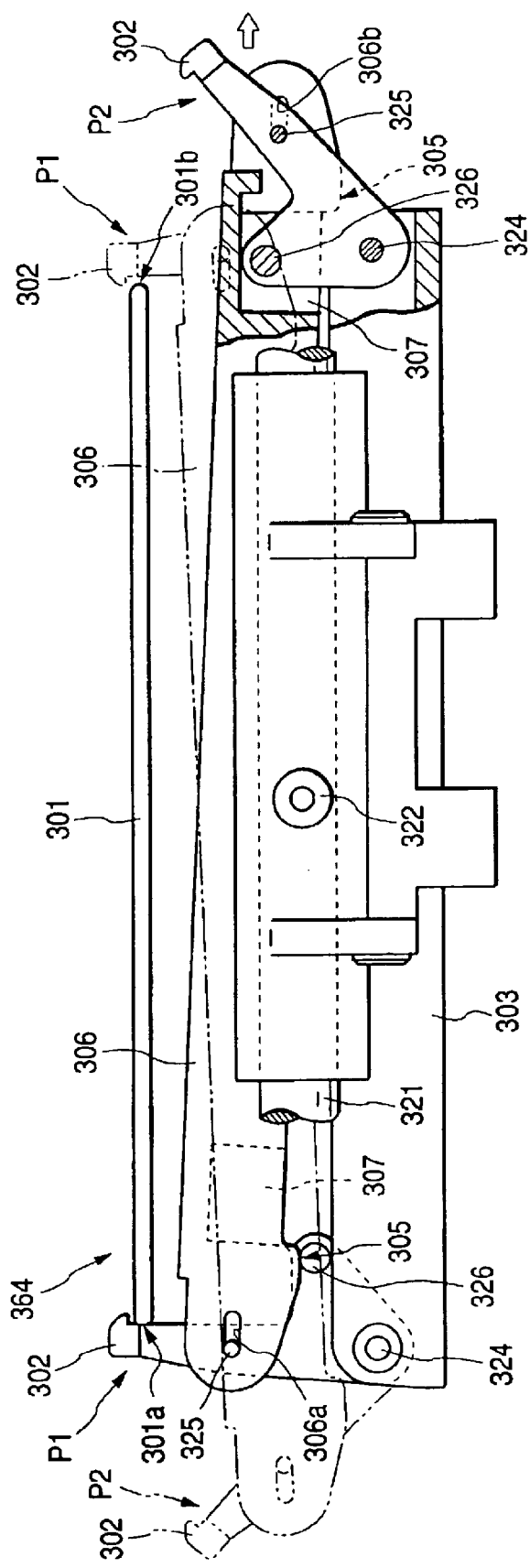
FIG. 22 is a side view, partly in cross section, showing card-transporting drive means of the card reader.
Figure 23:
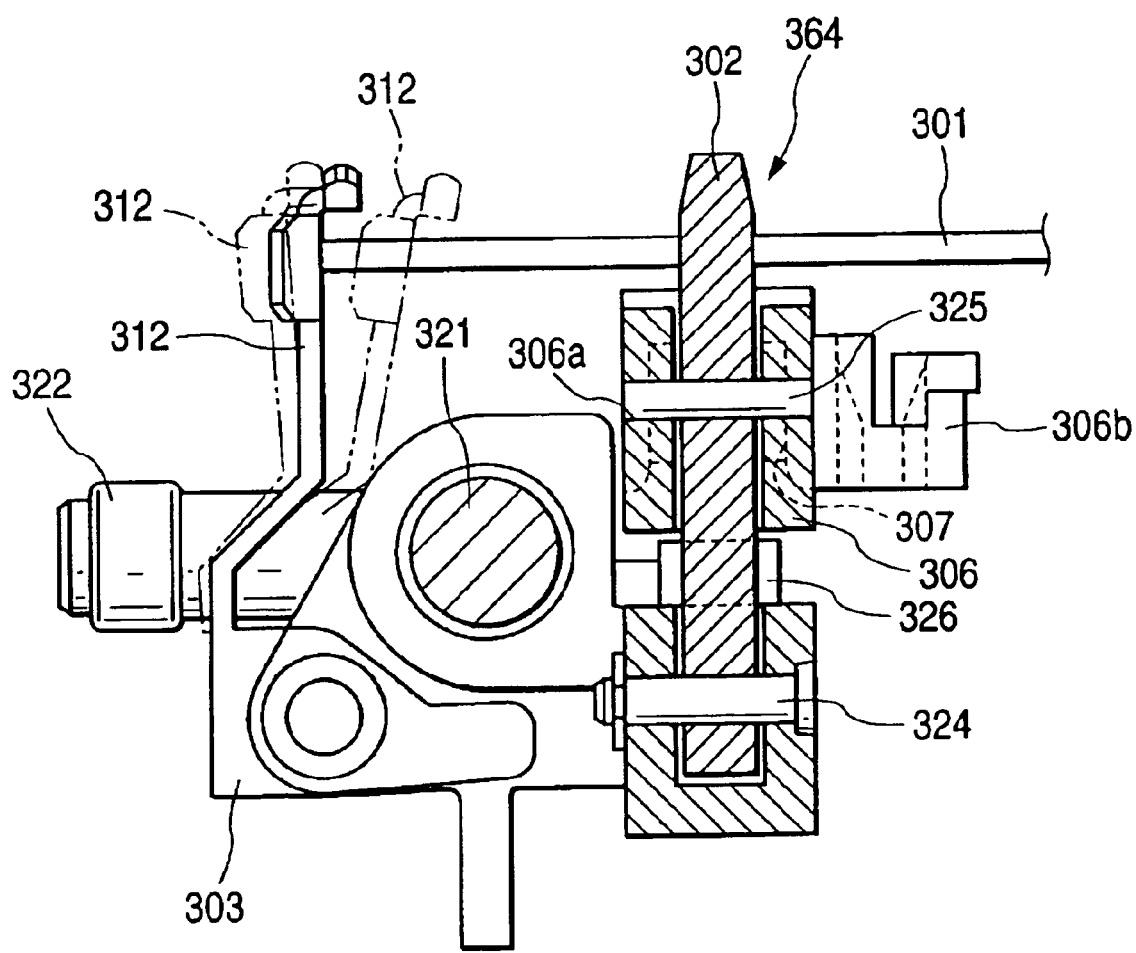
FIG. 23 is a transverse cross sectional view showing the card-transporting drive means.

In the card reader, a card traveling path is defined by right and left frames 308 and 309, and upper and lower guides 310 and 311. The card 301 is transported while being pressed to the right frame 309 and positioned by a pressing plate 312. That is, the right frame 309 provides a reference surface. In FIGS. 22 and 24, the pressing plate 312 is not shown.

The card taking-in/discharging drive means 363 includes a timing belt 313 arranged in the longitudinal direction of the card reader. The timing belt 313 extends around timing pulleys and 314 and 315. The card 301 which has been inserted through an card entrance 316 is nipped between the timing belt 313 on the timing pulley 314 and a pad roller 317, and taken into the card reader with rotation of the timing belt 313. The pad roller 317 is urged to the timing pulley 314 by a spring 318. A rotation position of the timing pulley 314 is fixed. A mid portion of the timing belt 313 is put to the left frame 308 by pulleys 319 and 320, whereby the interaction between the pulley and the carriage 303 is avoided.

The carriage 303 moves along a guide shaft 321 fixed to a lower guide 311. A roller 322 is rotatably mounted on the carriage 303. The roller 322 rolls along a guide plate 323 and a traveling guide 311a of the lower guide 311. Where the carriage 303 is supported by the single guide shaft 321, there is a chance that the carriage 303 is turned. In the embodiment, the rotation of the carriage 303 is prevented since the roller 322 rolls along the guide plate 323 and the traveling guide 311a of the lower guide 311. Thus, the carriage 303 is supported by one guide shaft 321, and its rotation is prevented by use of the roller 322. Therefore, the embodiment reduces manufacturing cost when comparing with the structure where the carriage 303 is supported by two shafts and its rotation is prevented by use of the two shafts.

The card transporting members 302 are rotatably mounted on the carriage 303 by a shaft 324. A shaft 325 is fixed to a mid-position of the card transporting member 302, and passes through an elongated hole 306a of the slide lever 306. That is, the two card transporting members 302 are coupled together by the slide lever 306.

A shaft 326 is fixed to the card transporting member 302, and when the shaft 326 is turned in the direction in which the card transporting member 302 rises, it comes into contact with the carriage 303. A position where the shaft 326 hits the carriage 303 is a card stop position P1, the card transporting members 302 cannot be turned beyond the card stop position P1. A length of the shaft 326 is shorter than the width of the moving portion 307 formed on the slide lever 306.

The moving portion 307 of the slide lever 306 is shaped like a concavity for receiving the shaft 326. The end of the slide lever 306 of the moving portion 307 is formed as the blocking portion 305. In a state that the card transporting member 302 is raised by the slide lever 306 and moved to the card stop position P1, viz., a state of the card transporting member 302 indicated by a solid line in the left hand portion in FIG. 22, the shaft 326 is brought into contact with the blocking portion 305. Accordingly, the card transporting members 302 are locked at the card stop position P1, and there is no chance that it falls down to the retract position P2 or is instable. When the slide lever 306 shifts to the left in the drawing from this state and the shaft 325 reaches the opposite end of the elongated hole 306a, viz., the slide lever 306 moves a distance corresponding to a gap between the elongated hole 306a and the shaft 325 to the carriage 303, the shaft 326 comes off from the blocking portion 305 and faces the moving portion 307. Accordingly, the locking of the card transporting member 302 is removed, the card transporting member 302 may be turned toward the retract position P2 while putting the shaft 326 into the moving portion 307. That is, when the card 301 is transported, the card transporting member 302 is locked. Accordingly, there is no chance that it falls down or is instable. When the slide lever 306 is slid to the carriage 303 in order to transport the card 301, the locking of the card transporting member 302 is removed, and it may be turned.

The transportation drive member 304 may be a wire. This wire is wound around a pair of pulleys 327 and 328. A plate 329 caulked by the wire 304 is fit into a joint portion 306b of the slide lever 306, and firmly fastened thereto. The slide lever 306 moves by the driven transportation drive member 304; the card transporting member 302 is turned; and the card transporting member 302 reaching the card stop position P1 causes the carriage 303 to move. The pulley 328 which drives the transportation drive member 304 engages the gear portion 340a of the first follower-side rotational gear 340 with gears gear 356 and 357 intervening therebetween.

In the drive-force transmission mechanism 336 of the embodiment, a worm gear 358 is fixed to a spindle shaft 330a of the motor 330. The worm gear 358 is in mesh with a gear 360 fixed to a shaft 359 rotatably supported. The gear 360 engages the timing pulley 315 which drives the spring 318. A bevel gear 361 is fixed to the shaft 359. The bevel gear 361 is in mesh with a bevel gear 362, which rotates together with the drive-side rotational gear 339. Accordingly, a rotation of the motor 330 is transmitted through the following route: worm gear 358→gear 360→shaft 359→bevel gear 361→bevel gear 362→drive-side rotational gear 339. In the drive-force transmission mechanism 336 of the embodiment, a drive force to the timing belt 313 is taken out of the timing pulley 315, which rotates together with the gear 360. A drive force to the wire 304 is taken out of the pulley 328, which is in mesh with the first follower-side rotational gear 340 through the gears 356 and 357. Accordingly, there is no need of taking the drive force from the second follower-side rotational gear 341. For this reason, a gear portion for drive force transmission is not formed in the second follower-side rotational gear 341.

An operation of the card transporting mechanism will be described.

In a state that the card 301 is not taken into the card reader, the carriage 303 is positioned at the card entrance 316.

The card 301 is inserted through the card entrance 316, and a sensor (not shown) senses the card insertion, and the motor 330 responsively starts to operate. At the same time, the solenoid 333 is turned on, the first follower-side rotational gear 340 is locked, and the locking of the second follower-side rotational gear 341 is removed. A drive force of the motor 330 is transmitted through a route of worm gear 358→gear 360→shaft 359→timing pulley 315→timing belt 313, and the timing belt 313 is turned counterclockwise in FIG. 21. As a result, the card 301 is taken in to the card reader while being nipped between the timing belt 313 on the timing pulley 314 and the pad roller 317. Since the first follower-side rotational gear 340 is locked, the rotation of the motor 330 is not transmitted to the pulley 328, and accordingly it is at a standstill. In this state, the rotation of the motor 330 is transmitted to the second follower-side rotational gear 341, but it is in an idling state because the gear portion for drive force transmission is not formed therein.

When a sensor (not shown) detects that the card 301 is taken in and reaches a predetermined position, i.e., a position facing the card transporting member 302, the solenoid 333 is turned on. Accordingly, the second follower-side rotational gear 341 is locked, and the first follower-side rotational gear 340 is released from its locked state. Accordingly, a rotation of the motor 330 is transmitted through a route of worm gear 358→ gear 360→ shaft 359→bevel gear 361→bevel gear 362→drive-side rotational gear 339→planetary gear 346→shafts 345→first follower-side rotational gear 340→gear portion 340a→gear 356→gear 357→pulley 328. As a result, the a308 is pulled by the transportation drive member 304 to move in the card transporting direction. The card transporting member 302 corresponding to the trailing end face 301a of the card 301 is moved to the card stop position P1, while the card transporting member 302 corresponding to the leading end face 301b is moved to the retract position P2.

In this state, the motor 330 further continues its driving of the wire 304. Then, the drive force of the wire 304 is transmitted to the carriage 303 since the shaft 326 of the card transporting member 302 present at the card stop position P1 is in contact with the carriage 303, and transports the card 301 and the carriage 303. In this state, the shaft 326 of the card transporting member 302 which now engages in transporting the card 301 is in contact with the blocking portion 305, and locked at this position. Therefore, it never turns down or becomes instable by a counter force received from the card 301. Therefore, the card 301 can be transported at a constant speed.

After magnetic data is read out of in the card 301 by the magnetic head 334 (not shown) attached tot he lower guide 311, the motor 330 is rotated in the reverse direction to return the card 301 to the card entrance 316. By the reverse rotation of the motor 330, the wire 304 turns in the direction opposite to that in the pervious case. And the slide lever 306 first moves relative to the card transporting member 302 since the shaft 325 coupling the slide lever 306 to the card transporting member 302 passes through the elongated hole 306a. When the slide lever 306 slides a distance corresponding to a gap between the elongated hole 306a and the shaft 325, the shaft 325 reaches the opposite end of the elongated hole 306a. Accordingly, the card transporting member 302 located at the retract position P2 is raised and moves to the card stop position P1. At the same time, the shaft 326 of the card transporting member 302 which has been at the card stop position P1 comes off from he second card engaging/holding member 5, and faces the moving portion 307. The locking of the card transporting member 302 at the card stop position P1 is removed. The slide lever 306 turns downward the card transporting member 302 and moves it to the retract position P2. The card transporting member 302, which is the counter part of the card transporting member 302 used in the previous case, stops the card 1. Subsequently, the movement of the wire 304 causes the card 301 and the carriage 303 to move toward the card entrance 316.

The card 301 is transported to the timing belt 313, and discharged out of the card reader through the spring 318. Specifically, the wire 304 of the card transporting drive means 364 transports the card 301 till it is nipped between and pulled into by the timing belt 313 on the timing pulley 314 as card taking-in/discharging drive means 363 and the pad roller 317. At this time, the card transporting member 302 existing in the advancing direction of the card 301 has been moved to the retract position P2. Accordingly, it does not intervene the discharging operation of the card 301. After the card 301 is transferred to the timing belt 313, the solenoid 333 is turned off, the movement of the carriage 303 by the wire 304 stops, and the carriage 303 is standstill at a stand-by position.

To discharge the card 301 from the inner part of the card reader, the card is nipped between the timing belt 313 on the timing pulley 315 and the pad roller 335, and transported out of the card reader.

While a specific embodiment of the present invention have been described, it should be understood that the invention is not limited to those mentioned ones but it may variously be modified, altered and changed within the true spirits of the invention. In the embodiment mentioned above, when the solenoid 333 is turned on, the first follower-side rotational gear 340 is locked to stop the drive of the wire 304, and when the solenoid 333 is turned off, the second follower-side rotational gear 341 is locked to drive the wire 304. Alternatively, when the solenoid 333 is turned off, the first follower-side rotational gear 340 is locked to stop the drive of the wire 304, and when the solenoid 333 is turned on, the second follower-side rotational gear 341 is locked to drive the wire 304.

The distal end of the card engaging/holding member 302 is not always shaped like a pawl. Instead, it may be simply shaped as shown in FIG. 27 (*7).

The pressing plate 312 may be mounted on a frame 308, for example, instead of the card transporting member 302.

In the above-mentioned embodiment, when the card 301 is taken into the card reader through the card entrance 318, the card 301 is transported by the utilization of the combination of the timing belt 313 and the pad roller 317. Alternatively, paired rubber rollers arranged so as to nip the card 301 therebetween may be used in place of the combination of the timing belt 313 and the pad roller 317.

In the embodiment mentioned above, one motor 330 is used for rotating the pulley 328 for driving the wire 304 and the timing pulley 315 for driving the timing belt 313. In an alternative, the pulley 328 may be driven by a motor, and the timing pulley 315 may be driven by another motor. In this case, the clutch mechanism 332 may be omitted.

Fourth Embodiment

The present invention will be described by use of the best mode of the invention shown in the accompanying drawings.

FIGS. 28 through 31 show an embodiment of a shutter opening/closing mechanism according to the present invention. The shutter opening/closing mechanism includes a shutter plate 502 which is movable between a closing position (indicated by a solid line in FIG. 28 where it closes a card transporting path 519 and an opening position (indicated by a two-dot chain line in FIG. 28) for opening the card transporting path 519. The shutter opening/closing mechanism includes a drive source 503 for moving the shutter plate 502, and a connecting member 504 for connecting a drive force of the drive source 503 to the shutter plate 502. The opening/closing side end face of the shutter plate 502 closes substantially parallel to the surface of the card transporting path 519 at a closing position. And the opening/closing side end face 502a of the shutter plate 502 is moved substantially parallel to the surface of the card transporting path 519 by the drive source 503.

In the embodiment, the drive source 503 may be a solenoid, and the connecting member 504 includes a slide lever (slide member) 505 which is moved by the a drive source 503, and two swing arms (swing member) 506 coupled to the slide lever 505. Through an action of the two swing arms 506, the opening/closing side end face 502a of the shutter plate 502 is moved substantially parallel to the surface of the card transporting path 519 by the drive source 503. The two swing arms 506 are coupled so as to follow the slide lever 505 in movement. A blocking portion 507 for blocking its movement from the swing arms 506 side at an opening/closing position is formed between the two swing arms 506 and the slide lever 505.

A solenoid 503 is mounted on a base plate 509 on which an card entrance unit 508 is mounted. A drive force of the solenoid 503 is transmitted through a spring pin 510 to the slide lever 505. The slide lever 505 is slidably mounted on the base plate 509 by use of two shafts 511.

Figure 32:
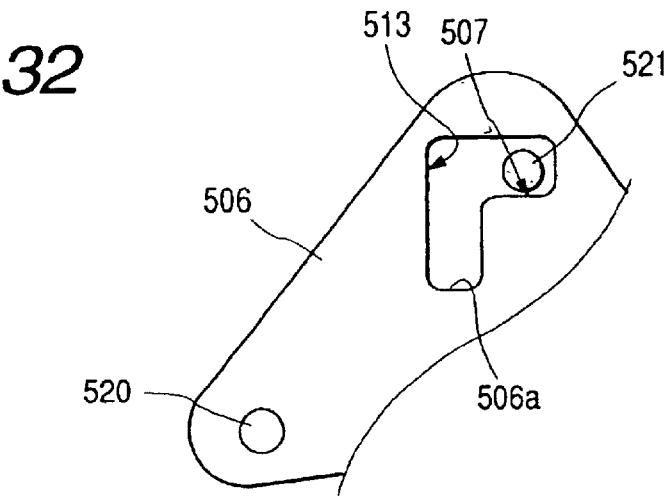
FIG. 32 is an enlarged view showing swing arms in the shutter opening/closing mechanism.

The swing arms 506 is rotatably supported on the base plate 509 by use of a shaft 520. The shutter plate 502 is rotatably coupled to one end of the swing arm 506 by a shaft 512. A hole 506a, shaped like inverse L, is formed in the other end of the swing arm 506 as best illustrated in FIG. 32. A shaft 21 fixed to the slide lever 505 passes through the hole 506a. A portion which faces the shaft 521 when the shutter plate 502 has been moved to a closing position is a blocking portion 7. A portion which will come into contact with the shaft 521 by the movement of the slide lever 505 is a contact portion 513.

A detecting part 505a of a microswitch 514 is attached to the slide lever 505. When the shutter plate 502 has completely been moved to a closing position, the microswitch 514 is turned on. The microswitch 514 sends an on signal to a host device (not shown). A pre-head 515 is attached to the card entrance unit 508, and detects an insertion of a card 501. Further, a groove 518 is provided between the card entrance unit 508 and the base plate 509. The shutter plate 502 is thrown down into the groove 518 to provide a closing position.

The card 501 is inserted through a card entrance 516. The pre-heated 51 detects the insertion of the card entrance 516, and the solenoid 503 is turned on. The solenoid 503 pulls the spring pin 510 while resisting a spring force of a return spring 517, to cause the slide lever 505 to slide in a direction of an arrow A in FIG. 28. Accordingly, the shaft 521 fixed to the slide lever 505 moves within the inverse L shaped hole 506a, hits the contact portion 513 to move it forward, and turns the swing arms 506 in a direction of an arrow B. As a result, the shutter plate 502 is lifted and moved to the opening position, the card entrance 516 (card transporting path 519) is opened as indicated by a two-dot chain line in FIG. 28. At this time, the wing arms 506 likewise raise both ends of the shutter plate 502, so that the opening/closing side end face 502a of the shutter plate 502 moves substantially parallel to the card transporting path 519.

When the solenoid 503 is turned off, the return spring 517 pushes back the spring pin 510, and the slide lever 505 is returned to its original position. Accordingly, the shaft 521 having pushed the contact portion 513 moves apart from the contact portion 513. The force having lifting the shutter plate 502 is removed, so that the shutter plate 502 descends while turning the card entrance unit 508 in the direction opposite to the direction B. As indicated by a solid line in FIG. 28, the shutter plate 502 closes the card entrance 516. At this time, the two swing arms 506 press down both ends of the shutter plate 502 simultaneously. Accordingly, the opening/closing side end face 502a of the shutter plate 502 moves substantially parallel and drops deep into the groove 518 over the entire width of the card.

When the shutter plate 502 has completely moved to the closing position, the shaft 521 fixed to the slide lever 505 moves to a position where it faces the blocking portion 507 of the hole 506a. In this state, if the shutter plate 502 is forcibly lifted to open, the blocking portion 507 hits the shaft 521 to lock the swing arms 506. Consequently, it is impossible to open the shutter plate 502. Thus, the function to prevent the shutter plate 502 from being opened by mischievous action is given to the device.

In this shutter opening/closing mechanism, it is opened and closed by moving the shutter plate in parallel. Accordingly, the card entrance 516 may be opened and closed with a less quantity of movement over the entire width of the card. Even when the user quickly inserts a card, and the card is pressed against the shutter plate 502 before it is incompletely opened, the shutter plate 502 may be opened by small force. For those reasons, a small solenoid may be used for the solenoid 503.

Further, it is opened and closed by moving the shutter plate 502 in parallel. Accordingly, the opening/closing side end face 502a of the shutter plate 502 may be put deep into the groove 518 over the entire width of the card. Therefore, even if the card trap member is inserted to any position, it may be detected equally. Accordingly, the performance of detecting the card trap member is improved.

Figure 33:
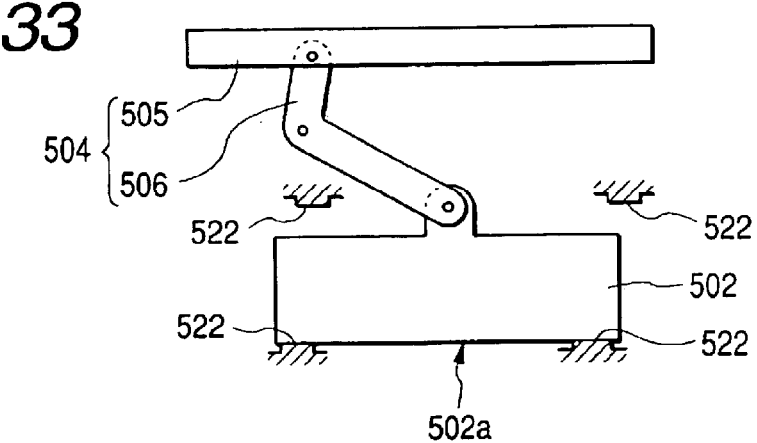
FIG. 33 is a view schematically showing another embodiment of a shutter opening/closing mechanism according to the present invention.
Figure 34:
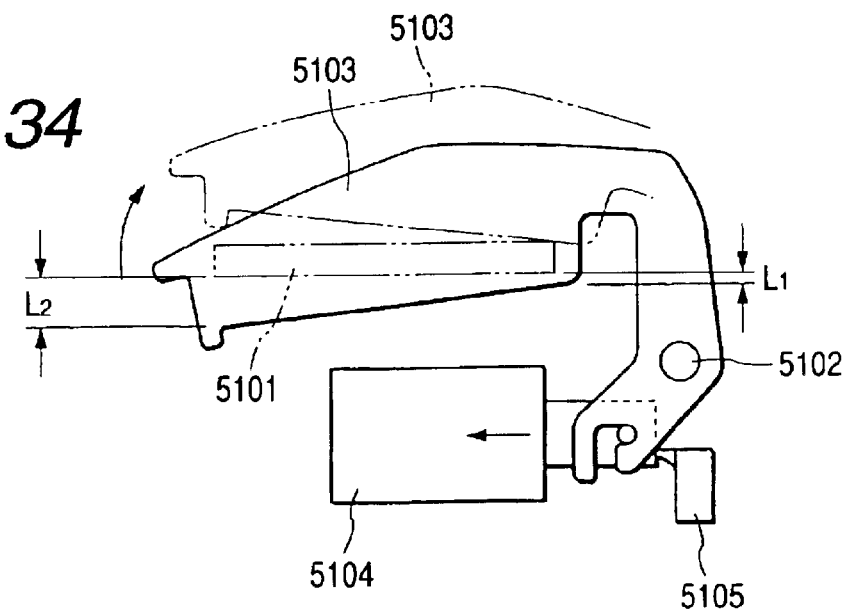
FIG. 34 is a view schematically showing a conventional shutter opening/closing mechanism.

While a specific embodiment of the present invention have been described, it should be understood that the invention is not limited to those mentioned ones but it may variously be modified, altered and changed within the true spirits of the invention. In an alternative, as shown in FIG. 33, the connecting member 504 is formed with a slide lever 505 moved by the solenoid 503 and one swing arm 506 coupled to the slide lever 505. The opening/closing side end face 502a of the shutter plate 502 is moved substantially parallel to the card transporting path 519 by the single swing arm 506. In FIG. 33, reference numeral 522 designates protrusions for fixing the shutter plate 502 in a parallel posture at the closing and opening positions.

The lift opening system in which the shutter plate 502 is moved to the opening position by lifting it may be substituted by a descend opening system in which the shutter plate 502 is moved to the opening position by descending it.

As seen from the foregoing description, in a card transporting mechanism for a card reader of the invention, said first card engaging/holding member is mounted on a carriage movable in the card transporting direction such that said first card engaging/holding member is movable between a first position where said first card engaging/holding member comes in contact with the trailing end of said card and a second position where said first card engaging/holding member does not comes in contact with said card, a transportation drive member for transporting the card is coupled to said first card engaging/holding member such that a position of said first card engaging/holding member changes in accordance with a moving direction of said transportation drive member, and when said card travels in a first direction, said first card engaging/holding member is located, by said transportation drive member, at a position where said first card engaging/holding member comes in contact with the trailing end face of said card, and said card is transported by moving said carriage. Therefore, the carriage does not start to move till the first card engaging/holding member holds the card. Accordingly, when a moving speed of the carriage is greatly different from a card taking-in speed, there is no chance that the great speed difference causes the card to slip off or the roller to be worn. Further, the holding of the card by the first card engaging/holding member may be removed at a desired position. Accordingly, the card transporting mechanism may be applied to the card reader of the type in which the card transporting path is branched at a mid position on the path.

In the card transporting mechanism of the invention, a second card engaging/holding member, which is movable between a third position where said second card engaging/holding member comes in contact with the leading end of said card and a fourth position where said second card engaging/holding member does not come in contact with the leading end of said card and a fourth position, is coupled to said carriage such that when said first card engaging/holding member is at said first position, said second card engaging/holding member is placed at said fourth position, and when said card is transported in the reverse direction, said second card engaging/holding member is placed at said third position, and said carriage is moved to transport said card. When the card is moved forward or backward, the holding of the card by each card engaging/holding member may be removed at any position. Therefore, the card transporting mechanism may be applied to a card reader of the type in which the card transporting path is branched at a desired position in both card transporting directions.

In the card transporting mechanism of the invention, said first card engaging/holding member, which is located closer to the card entrance side at the time of card insertion, is located at said second position. Therefore, when a card is inserted through the card entrance, interference of the inserting card with the first card engaging/holding member is avoided.

In the card transporting mechanism of the invention, said first and second card engaging/holding members are rotatably mounted on said carriage, and said transportation drive member is a string-like member with an engaging portion so that said first and second card engaging/holding members are controllable from both sides thereof. Therefore, when the string-like member of the transportation drive member is moved, the engaging portion controls positions of the first and second card engaging/holding members, whereby the card may be stopped by either of the first and second card engaging/holding members.

In a forcibly card discharging method for a card reader, a card engaging member which may come in contact with said card is provided on a moving body moving together with said card so as to taking said card that is inserted through said card entrance into the inner part of said image reader by said card transporting means, when said card stays at said card entrance, said moving body is moved to the inner part and said card engaging member is moved to a position where said card engaging member comes in contact with said card, thereafter said moving body is moved toward said card entrance, and said card engaging means is brought into engagement with the inner-side end face of said card from the inner part of said card reader, to thereby discharge said card out of said card reader. Therefore, the forcibly card discharging method forcibly discharges a card by the utilization of the card transporting mechanism which is originally incorporated into the card reader. Therefore, any additional component part or parts are needed for forcibly discharging the card, and hence the forcibly discharging function is realized at low cost. Further, the card reader with the card transporting mechanism may be made compact in size.

A forcibly card discharging mechanism for a card reader includes a moving body moving together with said card so as to taking said card that is inserted through said card entrance into the inner part of said image reader by said card transporting means; a card engaging member moving together with said moving body, coming in contact with said card, and also the inner-side end face of said card; and detecting means for detecting that said card stays at said card entrance; wherein said detecting means detects that said card stays, said moving body is moved, thereafter said moving body is moved, and said card engaging means is brought into engagement with the inner-side end face of said card from the inner part of said card reader, to thereby discharge said card out of said card reader. With such a construction, the forcibly card discharging method forcibly discharges a card by the utilization of the card transporting mechanism which is originally incorporated into the card reader. Therefore, any additional component part or parts are needed for forcibly discharging the card, and hence the forcibly discharging function is realized at low cost. Further, the card reader with the card transporting mechanism may be made compact in size.

In the drive force transmission mechanism of present invention, first and second follower-side rotational gears are provided coaxial with a drive-side rotational gear rotated by the motor, a planetary gear member which is in mesh with the drive-side rotational gear and the second follower-side rotational gear is mounted on the first follower-side rotational gear, selective engaging/stopping means for selectively engaging and stopping one of the first and second follower-side rotational gears is provided, and the drive systems are coupled to the first and second follower-side rotational gears. A drive system for transmitting a rotation of the motor may be selected by selecting one of the follower-side rotational gears by means of the selective engaging/stopping means.

In this case, the drive-force transmission mechanism of present invention is preferably constructed in which the drive-side rotational gear and the first and second follower-side rotational gears are provided on a single shaft in a juxtaposing fashion, the planetary gear member includes two planetary gears mounted at both ends of a shaft rotatably held at an eccentric position of the first follower-side rotational gear, the first follower-side rotational gear includes a latch portion latched by the selective engaging/stopping means and a drive-force transmission gear portion, which are disposed around the first follower-side rotational gear, the second follower-side rotational gear includes a gear portion in mesh with the planetary gear, and a latch portion latched by the selective engaging/stopping means and a drive-force transmission gear portion, which are disposed around the second follower-side rotational gear. If so doing, the drive system may be selected by the selective engaging/stopping means, with a simple construction.

The drive-force transmission mechanism is constructed in which the selective engaging/stopping means includes a rotational member with two engaging members which may engage the two latch portions, and is rotated by a solenoid. With such a construction, the drive system for transmitting a rotation (drive force) of a motor may be selected by a drive force of the solenoid. Therefore, there is no need of using a relatively expensive actuator, for example, an electromagnetic clutch. Manufacturing cost of the drive-force transmission mechanism is reduced by using a relatively inexpensive solenoid. The solenoid is an actuator which is relatively small in size and low in cost. Therefore, the drive-force transmission mechanism may be reduced in size and weight. Further, power consumption of the solenoid is small. Therefore, a drive-force transmission mechanism of the power saving type, which consumes less electric power, is provided.

As in the drive force transmission, the engaging member preferably includes engaging pawls which may engage the bifurcated latch portion. With such a construction, the engaging pawls are independently displaced, so that one of the pawls does not affect the other. Accordingly, there is no chance that when one of the engaging pawls is displaced, the other comes off. A stable engaging state is realized.

In a card transporting mechanism of the present invention, first and second follower-side rotational gears are provided coaxial with a drive-side rotational gear rotated by the motor, a planetary gear member which is in mesh with the drive-side rotational gear and the second follower-side rotational gear is mounted on the first follower-side rotational gear, selective engaging/stopping means for selectively engaging and stopping one of the first and second follower-side rotational gears is provided, and the card transporting drive means is coupled to one of the first and second follower-side rotational gears. Therefore, a card transporting mechanism using the above-mentioned drive-force transmission mechanism is provided.

In a card transporting mechanism of the present invention, the card transporting drive means includes a card transporting member for transporting a card while being in contact with the trailing end of the card, the taking-in/discharging drive means takes in an inserted card to a position where the card transporting member comes in contact with the trailing end of the card. Therefore, a card transporting mechanism capable of reliably transporting a card is provided.

As described above, in a card transporting mechanism of the present invention, the card engaging/holding member is mounted on a carriage movable in the card transporting direction such that the card engaging/holding member is movable between a first position where the card engaging/holding member comes in contact with the trailing end of the card and a second position where the card engaging/holding member does not comes in contact with the card, the card engaging/holding member is moved between the first and second positions by a transportation drive member for transporting the card, and a blocking portion for blocking, at the first position, the movement of the card engaging/holding member to the second position, is provided.

Therefore, the carriage does not start to move till the card engaging/holding member holds the card. Accordingly, when a moving speed of the carriage is greatly different from a card taking-in speed, there is no chance that the great speed difference causes the card to slip off or the roller to be worn. Further, the holding of the card by the card engaging/holding member may be removed at a desired position. Accordingly, the card transporting mechanism may be applied to the card reader of the type in which the card transporting path is branched at a mid position on the path. Further, the card engaging/holding member may be locked at the first position. Therefore, the card never turns down or becomes instable by a counter force received from the card. Therefore, the card can be transported at a constant speed.

In the card transporting mechanism of the present invention, the card engaging/holding members are located at the front and rear positions of the carriage, the card engaging/holding member located closer to the trailing end of the card as viewed in the card transporting direction is located at the first position, and the card engaging/holding member located closer to the leading end of the card is located at the second position. When the card is moved forward or backward, the holding of the card by the card engaging/holding member may be removed at any position. Therefore, the card transporting mechanism may be applied to a card reader of the type in which the card transporting path is branched at a desired position in both card transporting directions.

According to the present invention, the card engaging/holding members located at the front and rear ends of the carriage may be coupled together by an interlocking member coupled to the transportion drive member so that the card engaging/holding members are turned concurrently. According to the present invention, the interlocking member may consist of a single lever, and a moving portion for moving the card engaging/holding member and a blocking portions may be provided on the lever while corresponding to the two card engaging/holding members.

The shutter opening/closing mechanism of present invention comprises: a drive source for moving the shutter plate; and a connecting member for connecting a drive force of the drive source to the shutter plate; wherein the opening/closing-side end face of the shutter plate is closed substantially parallel to the card transporting path at the closing position, and the opening/closing-side end face of the shutter plate is moved, by the drive source, substantially parallel to the card transporting path. A foreign material inserted to between it and the shutter plate is reliably detected over the entire width of the card. Accordingly, the performance of detecting the card trap member is improved. A stroke for opening and closing the shutter plate is minimized over the entire width of the card. Therefore, a small drive source may be used.

In the shutter opening/closing mechanism, the drive source is a solenoid, the connecting member includes a slide moved by the solenoid and two turning members coupled together by the slide member, the opening/closing-side end face of the shutter plate is moved, by the two turning members, substantially parallel to the card transporting path. Therefore, the shutter plate is moved substantially parallel to the card transporting path, with a simple structure.

In the shutter opening/closing mechanism, the two connecting members are coupled so as to follow the slide member in movement, and a blocking portion for blocking its movement from the turning member side is provided the two connecting members and the slide member. Therefore, it is impossible to forcibly open the shutter plate having been moved to the opening position by mischievous actions. Thus, the construction of preventing such mischief is given to the device.

The shutter opening/closing mechanism may be constructed, such that the connecting member includes a slide member moved by the drive source, and one turning member coupled to the slide member, and the opening/closing-side end face of the shutter plate is moved, by the one turning member, substantially parallel to the card transporting path.

What is claimed is:

1. A shutter opening/closing mechanism for a card reader, comprising:
   a card entrance for inserting a card into the card reader;
   a card transporting path in the card reader, into which the inserted card travels, said card entrance disposed at a first end of said card transporting path;
   a shutter plate, disposed on a side of said card entrance, which opens and closes the card entrance by moving between a closing position for closing the card transporting path and an opening position for opening the card transporting path, said closing position and said opening position of said shutter plate being located at the side of said card entrance;
   a drive source for moving said shutter plate; and
   a connecting member for connecting a drive force of said drive source to said shutter plate,
   wherein an opening/closing-side end face of said shutter plate is closed substantially parallel to said card transporting path at said closing position, and said opening/closing-side end face of said shutter plate is moved, by said drive source, substantially parallel to said card transporting path and said drive source is a solenoid, said connecting member includes a slide member moved by said solenoid and two turning members coupled together by said slide member, said opening/closing-side end face of said shutter plate is moved, by said two turning members, substantially parallel to said card transporting path and said two turning members are coupled so as to follow said slide member in movement, and a blocking portion for blocking said slide member movement is provide between said two connecting members and said slide member and wherein further, the respective movements of said turning members, said slide member and said shutter plate are all in a substantially single plane.

2. The shutter opening/closing mechanism according to claim 1, wherein said connecting member includes a slide member moved by said drive source, and one turning member coupled to said slide member, and said opening/closing-side end face of said shutter plate is moved, by said one turning member, substantially parallel to said card transporting path.

3. The shutter opening/closing mechanism according to claim 1, further comprising a card trap member detection mechanism, wherein said mechanism includes a detecting part connected to said drive source, and a microswitch connected to said detecting part, wherein said shutter plate is prevented from moving into said closing position when a card trap member is detected, thereby preventing said microswitch from turning on.

4. A shutter opening/closing mechanism for a card reader, comprising:
   a card entrance for inserting a card into the card reader;
   a card transport path, into which the inserted card travels, said card entrance disposed at a first end of said card transport path;

a detector operable to detect a presence of a readable card in said card entrance;

a shutter plate operable to either block said card entrance by completely blocking said card transport path, or open said card entrance by being moved to a location other than said card entrance; and a drive means for moving said shutter plate into a blocking position or an open position, wherein said shutter plate and said card entrance are in a substantially single plane.

5. A shutter opening/closing mechanism for a card reader as claimed in claim 4, further comprising a groove adjacent said card transport path for receiving at least one entire side of said shutter plate when said shutter plate is moved to the blocking position.

6. A shutter opening/closing mechanism for a car reader, comprising:

a card entrance for inserting a card into the card reader;

a card transporting path in the card reader, into which the inserted card travels, said card entrance disposed at a first end of said card transporting path;

a shutter plate, disposed on a side of said card entrance, operable to open and close the card entrance by alternately moving between a normally closed position operable to block the card transporting path and an open position operable to open the card transporting path;

a drive source operable to move said shutter plate; and a pre-head disposed in the card transporting path between said card entrance and said shutter plate, said pre-head being operable to detect the presence of the card to control said drive source to move said shutter plate to the open position from the normally closed position, wherein said shutter plate and said card entrance are in a substantially single plane.

7. A shutter opening/closing mechanism for a card reader as claimed in claim 6, wherein an opening/closing-side end face of said shutter plate is closed substantially parallel to said card transporting path at said closing position, and said opening/closing-side end face of said shutter plate is moved, by said drive source, substantially parallel to said card transporting path.

* * * * *